(12) United States Patent
Keen et al.

(10) Patent No.: US 10,113,343 B2
(45) Date of Patent: Oct. 30, 2018

(54) THERMALLY ISOLATED HIGH INTENSITY LIGHT SOURCE

(71) Applicant: Surna Inc., Boulder, CO (US)

(72) Inventors: Stephen Keen, Erie, CO (US); Todd Whitaker, Boulder, CO (US); Jordan Johnson, Longmont, CO (US); Chris Pearson, Boulder, CO (US); Brady Schultz, Boulder, CO (US)

(73) Assignee: Surna Inc., Boulder, CO (US)

( * ) Notice: Subject to any disclaimer, the term of this patent is extended or adjusted under 35 U.S.C. 154(b) by 49 days.

(21) Appl. No.: 15/525,522

(22) PCT Filed: Oct. 23, 2015

(86) PCT No.: PCT/US2015/057216
§ 371 (c)(1),
(2) Date: May 9, 2017

(87) PCT Pub. No.: WO2016/077058
PCT Pub. Date: May 19, 2016

(65) Prior Publication Data
US 2017/0370570 A1  Dec. 28, 2017

Related U.S. Application Data

(63) Continuation-in-part of application No. PCT/US2015/028803, filed on May 1, 2015.
(Continued)

(51) Int. Cl.
*H01J 61/34* (2006.01)
*E05C 1/12* (2006.01)
(Continued)

(52) U.S. Cl.
CPC .................. *E05C 1/12* (2013.01); *A01G 9/26* (2013.01); *F21V 29/505* (2015.01); *F21V 29/67* (2015.01);
(Continued)

(58) Field of Classification Search
None
See application file for complete search history.

(56) References Cited

U.S. PATENT DOCUMENTS 3,193,001 A   7/1965 Meckler
3,662,203 A   5/1972 Kuhl et al.
(Continued)

FOREIGN PATENT DOCUMENTS

CH       292579 A     11/1953
CN       201555154     8/2010
(Continued)

OTHER PUBLICATIONS

PCT/US15/57216, filed Oct. 23, 2015.
(Continued)

*Primary Examiner* — Douglas W Owens
*Assistant Examiner* — Jianzi Chen
(74) *Attorney, Agent, or Firm* — Leydig, Voit & Mayer, Ltd.

(57) ABSTRACT

Provided herein is a high intensity discharge light source having a thermally insulative and optically transparent sleeve for maintaining or enhancing a spectral performance parameter. The configuration of the sleeve provides an insulative volume that allows an elevated steady state operating temperature to be reached, even when the light source is cooled. The sleeve is also configured to withstand a bulb failure event, thereby protecting the surrounding environment from falling debris. Also provided herein are methods for dissipating heat from the light source without adversely (Continued)

affecting the bulb operating temperature or the enhanced spectral performance parameter.

28 Claims, 26 Drawing Sheets

Related U.S. Application Data

(60) Provisional application No. 62/078,267, filed on Nov. 11, 2014, provisional application No. 62/117,302, filed on Feb. 17, 2015, provisional application No. 62/052,890, filed on Sep. 19, 2014, provisional application No. 61/987,905, filed on May 2, 2014.

(51) Int. Cl.
| | |
|---|---|
| *F21V 29/505* | (2015.01) |
| *A01G 9/26* | (2006.01) |
| *F21V 29/67* | (2015.01) |
| *F21V 29/503* | (2015.01) |
| *F21V 29/83* | (2015.01) |
| *H01J 61/50* | (2006.01) |

(52) U.S. Cl.
CPC ............. *H01J 61/34* (2013.01); *F21V 29/503* (2015.01); *F21V 29/83* (2015.01); *H01J 61/50* (2013.01)

(56) References Cited

U.S. PATENT DOCUMENTS

| | | |
|---|---|---|
| 3,777,199 A | 12/1973 | Davis |
| 4,078,169 A | 3/1978 | Armstrong |
| 4,101,424 A | 7/1978 | Schooley et al. |
| 4,460,942 A | 7/1984 | Pizzuti et al. |
| 4,462,390 A | 7/1984 | Holdridge et al. |
| D280,025 S | 8/1985 | Waters |
| 5,025,356 A | 6/1991 | Gawad |
| 5,107,407 A | 4/1992 | Collot et al. |
| D366,226 S | 1/1996 | Foutes |
| 5,489,813 A | 2/1996 | Jung |
| 5,612,585 A | 3/1997 | Verschueren |
| D381,734 S | 7/1997 | Murphy |
| 5,990,599 A | 11/1999 | Jackson et al. |
| 6,247,830 B1 | 6/2001 | Winnett et al. |
| 6,267,483 B1 | 7/2001 | Hembery |
| 6,329,742 B1 | 12/2001 | Nelson et al. |
| 6,595,662 B2 | 7/2003 | Wardenburg |
| 6,783,263 B1 | 8/2004 | Cronk |
| 7,083,309 B2 | 8/2006 | Chan et al. |
| 7,245,081 B2 | 7/2007 | Ashida et al. |
| 7,425,793 B2 | 9/2008 | Haga et al. |
| 7,441,915 B2 | 10/2008 | Shouse |
| 7,456,556 B2 | 11/2008 | Bonnin et al. |
| D605,809 S | 12/2009 | Noh |
| D611,643 S | 3/2010 | Owen |
| 7,722,228 B2 | 5/2010 | Broer |
| 7,954,982 B2 | 6/2011 | Keen |
| 7,972,044 B2 | 7/2011 | Burkhauser |
| 7,982,376 B2 | 7/2011 | Keen et al. |
| 8,040,031 B2 | 10/2011 | Sasai et al. |
| 8,317,360 B2 | 11/2012 | Lu et al. |
| 8,319,199 B2 | 11/2012 | Garcia |
| D698,986 S | 2/2014 | Reynolds |
| D698,987 S | 2/2014 | Reynolds |
| 8,668,362 B2 | 9/2014 | Nelson et al. |
| D715,466 S | 10/2014 | Wang |
| D715,467 S | 10/2014 | Bretschneider |
| D746,491 S | 12/2015 | Bendtsen |
| D748,319 S | 1/2016 | Johnson et al. |
| D748,320 S | 1/2016 | Johnson et al. |
| D748,847 S | 2/2016 | Johnson et al. |
| D748,850 S | 2/2016 | Johnson et al. |
| D794,842 S | 8/2017 | Keen et al. |
| 2001/0004320 A1 | 6/2001 | Wood |
| 2004/0037081 A1 | 2/2004 | Blandford |
| 2008/0037128 A1* | 2/2008 | Knapp .................. G02B 5/285 359/586 |
| 2008/0074880 A1 | 3/2008 | Keen et al. |
| 2009/0273921 A1 | 11/2009 | Chiang |
| 2009/0279303 A1 | 11/2009 | Keen |
| 2010/0207499 A1 | 8/2010 | Keen et al. |
| 2012/0125581 A1 | 5/2012 | Allen et al. |
| 2013/0003382 A1 | 1/2013 | Ohura et al. |
| 2013/0154475 A1* | 6/2013 | Boroczki .............. H01J 61/125 313/576 |
| 2013/0247959 A1 | 9/2013 | Kwon et al. |
| 2013/0343048 A1 | 12/2013 | Dumont |
| 2014/0049964 A1 | 2/2014 | McClure et al. |

FOREIGN PATENT DOCUMENTS

| | | | |
|---|---|---|---|
| JP | 2010-136717 | 6/2010 | |
| WO | WO 97/43578 | 11/1997 | |
| WO | WO 2008036930 | 3/2008 | |
| WO | WO 2008048080 A1 * | 4/2008 | ............. A01G 7/045 |
| WO | WO 2015/168559 | 11/2015 | |
| WO | WO 2016077058 | 5/2016 | |

OTHER PUBLICATIONS

U.S. Appl. No. 29/543,451, filed Aug. 15, 2017.
PCT/US15/28803, filed May 1, 2015.
U.S. Appl. No. 15/307,210, filed Oct. 27, 2016.
International Search Report and Written Opinion corresponding to International Application No. PCT/US2015/057216, dated Feb. 26, 2016.
Dimlux Expert Series 1000 Watt DE EL UHF flyer, 2 pages, Jul. 2014.
Dimlux Expert Series 315 Watt Full Spectrum flyer, 2 pages, Jul. 2014.
Eljen (2016) "Wavelength Shifters," Eljen Technology. Accessible on the Internet at URL: <http://www.eljentechnology.com/products/wavelength-shifting-plastics> [Last Accessed Nov. 21, 2017].
Epapillon 1000W flyer, 1 page, Sep. 10, 2014.
International Preliminary Report on Patentability corresponding to International Patent Application No. PCT/US2015/028803, dated Nov. 8, 2016.
International Search Report corresponding to International Patent Application No. PCT/US2015/028803, dated Jul. 31, 2015.
Lamp Tubing <http://www.momentive.com/Products/Main.aspx?id=20364> [Last Accessed Jun. 17, 2015].
Low-iron glass—clearly different. <www.guardian.com/GuardianGlass/glassproducts/UltraWhite/index.htm> (Guardian Low-iron glass). [Last Accessed Jun. 17, 2015].
Optimizing Lighting Efficiency with Glass. <www.iedjournal.com/main/blogs/optimizing-lighting-efficiency-with-glass/> [Last accessed Jun. 17, 2015].

* cited by examiner

| Ballast Power | Run Time Before Measurement | Quartz sleeve | Max PPFD ($\mu mol/m^2/s$) | Average PPFD ($\mu mol/m^2/s$) |
|---|---|---|---|---|
| 1000 W | 30 mins | No | 104.9 | 84.73 |
| 1000 W | 30 mins | Yes | 110.5 | 87.92 |
| 1000 W | 3 hrs | No | 105.1 | 84.85 |
| 1000 W | 3 hrs | Yes | 112.5 | 89.17 |
| 750 W | 30 mins | No | 73.3 | 59.55 |
| 750 W | 30 mins | Yes | 84.2 | 66.78 |
| 750 W | 3 hrs | No | 73.4 | 55.39 |
| 750 W | 3 hrs | Yes | 84.7 | 64.05 |

FIG. 19

|  | Without Tube | With Tube |
|---|---|---|
| Irradiance [W] (350-1000) | 7.823009926 | 8.964789029 |
| PPFD (µmol/m²/s) (400-700nm) | 27.96507651 | 30.71809158 |
| PPFD (µmol/m²/s) (350-750nm) | 30.51252365 | 35.22654061 |
| YPFD (µmol/m²/s) (350-750nm) | 26.67006878 | 29.25027366 |
| Photon Irradiance (µmol/m²/s) | 42.83236726 | 49.93594604 |
| Voltage [V] | 236.298 | 237.7186667 |
| Current [A] | 4.4639 | 4.431133333 |
| Power [W] | 1028.973333 | 1026.396667 |
| Apparent Power [W] | 1054.806667 | 1053.333333 |
| Frequency [Hz] | 59.972 | 60.0018 |
| Power Factor [unitless] | 0.975516667 | 0.97443 |

FIG. 22

THERMALLY ISOLATED HIGH INTENSITY LIGHT SOURCE

CROSS-REFERENCE TO RELATED APPLICATIONS

This application is a U.S. National Stage Application under 35 U.S.C. § 371 of International Application No. PCT/US2015/057216, filed Oct. 23, 2015, which claims the benefit of and priority to U.S. Pat. App. No. 62/117,302 filed Feb. 17, 2015 and 62/078,267 filed Nov. 11, 2014, and is a continuation-in-part of PCT App. No. PCT/US2015/028803 filed May 1, 2015 which claims the benefit of and priority to U.S. Pat. App. Nos. 62/078,267 filed Nov. 11, 2014, 62/052,890 filed Sep. 19, 2014 and 61/987,905 filed May 2, 2014, each of which are hereby individually incorporated by reference in their entirety to the extent not inconsistent herewith.

BACKGROUND OF INVENTION

Provided are high intensity discharge (HID) light sources that provide high efficiency and quality illumination via tight thermal control of the light sources without adversely heating the environment surrounding the light sources. Applications for the high intensity discharge light sources provided herein include agriculture, where increased efficiency of light application provides the functional benefit of improved growth characteristics, such as higher plant yields, while avoiding high temperatures that would otherwise hinder plant growth.

High intensity discharge light sources generate a significant amount of heat and also have a spectral output that is temperature dependent. This can complicate efforts to cool light sources in applications where heat build-up around the bulb is desirably avoided. For example, if a HID light source is actively cooled, the bulb operating temperature may be reduced with an attendant spectral output change that is no longer optimal. In agricultural applications, a well-controlled spectral output is important for achieving optimal plant growth, but it is important that the temperature of the environment in which the plants grow is not too high. Heat build-up, however, associated with use of one or more HID light sources adversely impacts plant growth, particularly for plants positioned immediately below the HID light source. Furthermore, the heat generated from the bulb can cause a bulb melt down or explosion, resulting in debris falling onto a plant canopy or other flammable material below the bulb, which in turn could result in fire.

Conventional systems that attempt to address certain of the above-referenced problems in the art suffer from fundamental disadvantages, including light fixtures that simply allow heat to escape to the environment. For example, U.S. Pat. No. 7,456,556 describes an outer envelope that is a tube of quartz or glass around a lamp, wherein in the case of lamp failure or explosion the outer envelope may contain glass pieces that fall and avoid injury. That tube, however, is configured to provide heating to the environment and to not trap heat inside the envelope, and accordingly is fundamentally incompatible with light sources having an insulative sleeve that traps heat next to the bulb to maintain a relatively high operating temperature.

U.S. Pat. No. 6,247,830 describes a cylindrical transparent sleeve for agricultural light bulbs. That system, however, dissipates heat from the light bulb by pushing or pulling air through the sleeve. This directly cools the bulb, having an adverse impact on the ideal operating temperature of the bulb and an attendant decrease in spectral output.

U.S. Pat. No. 7,245,081 describes a high intensity discharge lamp having a transparent outer jacket. That outer jacket, however, is to seal the arc tube from the outside environment and, therefore, is an integral part of the bulb, such as corresponding to the bulb outer surface. There is no teaching or suggestion of insulating the resultant bulb to control the bulk bulb operating temperature, such as under cooling conditions.

U.S. Pat. No. 7,083,309 describes a lamp with an integrated outer transparent tube. However, there is no teaching or suggestion as to the tube being thermally insulative, and the bulbs described therein are fluorescent lamps.

U.S. Pat. No. 8,040,031 describes a lamp with an outer bulb. That outer bulb, however, is to protect the lamp main body against external damage, prevent scattering of flakes due to breakage of the main body of the lamp, and decrease emission of ultra-violet radiation. There is no teaching or suggestion as to use of a thermally insulative sleeve to improve bulb spectral output.

There is a need in the art for a light source that can be operated at optimal efficiency by tightly controlling the operating temperature of the light source, including at relatively high operating temperature, without risking harm to the environment below such as by an unwanted temperature increase and/or risk of fire or injury in the event of a light source failure.

SUMMARY OF THE INVENTION

Provided herein is a HID light source operating at improved efficiency for optimal light output and methods related thereto. The configuration of the light source includes an optically transparent sleeve that thermally insulates an insulative volume surrounding the bulb, thereby allowing the bulb to operate at a steady-state and optimal higher temperature while still being able to apply active cooling mechanisms to the fixture cavity and/or environment surrounding the bulb surface. Ensuring a higher steady-state bulb operating temperature provides for optimal spectral output from the HID bulb when active cooling is applicable to the fixture or encapsulating environment.

Furthermore, the high intensity discharge light source is configured to prevent potential harm to the surrounding environment by minimizing the release of heat generated by the bulb, as well as shielding the environment from falling debris in the event of a bulb failure. Accordingly, the systems and methods provided herein not only ensure a retention of spectral performance, but also have the added functional benefit of increasing safety and reducing adverse heating in an environment surrounding the light source.

The high intensity discharge light sources described herein may comprise a bulb; a thermally insulative and optically transparent sleeve that surrounds the bulb and is separated from the bulb by an insulating distance; and a spacer for creating an insulative volume between the bulb and the sleeve, such as a spacer clip, bumper, or integrated positioner at each end of the bulb, such as a relief feature. During use, the bulb and insulative volume reach a steady state operating temperature to maintain or enhance a spectral performance parameter. In an aspect, the steady state operating temperature is characterized as having a high temperature. In this context, high temperature refers to the configuration of the insulative sleeve provided herein that elevates temperature compared to conventional systems wherein heat dissipation out of the bulb to the surrounding environment is encouraged and facilitated, such as by active convective air flow over the bulb surface. In this context, the elevated temperature may be quantified in terms of a percentage increase compared to conventional systems without the sleeve, such as at least a 5%, 10%, or 20% increase in temperature, particularly during forced airflow introduction. The spectral performance parameter may be quantified in terms of an increase in photosynthetic photon flux density (PPFD) and/or a spectral shift. In an embodiment, the PPFD is increased by at least 5% compared to a corresponding system that does not include a sleeve as described herein. This increase in PPFD is attributed to an operating temperature increase that better matches bulb optimum operating temperature.

The bulb of the high intensity discharge light source may have a substantially elevated operating temperature in comparison to the operating temperature without the sleeve, and under active cooling conditions. As aforementioned, the substantially elevated operating temperature may be described in terms of a percentage increase in temperature, such as at least a 5%, 10%, or 20% increase in temperature. Furthermore, any of the systems and methods provided herein may include a cooling component for further ensuring the surrounding environment does not experience an unwanted increase in temperature, without unduly decreasing the operating temperature of the light source. Examples of cooling components include a passive cooling component and/or an active cooling component. A passive cooling component may simply comprise vents through an optical reflector in which the HID light source is positioned. Air flow via convection may pass over the sleeve outer surface and out of the optical reflector, thereby cooling without adversely decreasing the temperature of the insulative volume surrounding the bulb and within the sleeve. Active cooling may comprise forced air flow, such as by an air mover, blower, or a fan that actively forces a flow of air over the outer sleeve surface. The air itself may be cooled, including by a liquid-cooled heat exchanger. Any of the systems described in PCT/US2015/028803 filed May 1, 2015, specifically incorporated by reference herein, may be used or combined with any of the light sources described herein.

The bulb may be concentrically positioned within the sleeve. Alternatively, the bulb may be eccentrically positioned within the sleeve. In either alternative, it is preferred that the outer surface of the bulb does not physically contact the inner surface of the sleeve, thereby minimizing or avoiding direct thermal convection between bulb and sleeve. Alternatively, if in contact, an insulative component may be positioned to provide a thermal barrier to minimize direct thermal exchange between the sleeve and bulb.

The sleeve may be removable. This facilitates reuse of the sleeve when the bulb life ends or if the bulb is damaged. Similarly, a sleeve may be replaced without having to replace the bulb. The sleeve may be configured to withstand a bulb explosion event. The sleeve thickness may be between 0.5 mm and 4 mm and withstands bulb failure while providing good optical transmission from the bulb to the surrounding environment. Ideally, the sleeve permits transmission of substantially all light in the photosynthetic range (wavelength of 350 nm to 700 nm, or 400 nm to 700 nm) that is emitted from the bulb. In this context, "substantially all" refers to at least 95%, or at least 98%, of light over a user-selected wavelength range, such as 400 nm to 700 nm, that is transmitted through the sleeve to the surrounding environment or any subranges thereof, depending on the application of interest. The sleeve may be between 1.5 mm and 2 mm thick, including 1.5 mm thick.

The sleeve may be made of quartz. Quartz is a desirable material because it has good optical and thermal characteristics, as well as sufficient strength to contain bulb failure. The systems and methods provided herein are compatible with any material that exhibits these desired characteristics, including but not limited to lead-free glass and plastics that can withstand temperatures generated by the bulb, such as about 600° F. or higher without being destroyed, such as by melting or deformation. Wavelength altering/shifting plastics that can withstand an environment of 600° F. or higher may also be used. For example, plastics similar to those by Eljen Technology (Sweetwater, Tex.), based on polyvinyltoluene and variants thereof, provide good temperature characteristics and wavelength shifting capability. EJ-280 wavelength shifting plastic absorbs blue light and emits green light; EJ-284 wavelength shifting plastic absorbs green light and emits red light (available at www.eljentechnology.com/index.php/products/wave-length-shifting-plastics). As desired, combinations of glass/quartz and plastic may be used, such as a plastic-coated quartz sleeve, to obtain the desired optical characteristics.

The thermally insulative and optically transparent sleeve can have any number of cross-sectional shapes, depending on the application of interest. For example, the cross-sectional shape may be circular, elliptical, or may have three or more sides, such as triangular, square, rectangular, and the like. Amorphous sleeve shapes may also be used, such as a cylinder with random ridges, valleys, pocks, and/or etchings, which create an inconsistent architecture depending on the application of interest and desired optical characteristics.

As desired, additional optical components may be incorporated into the sleeve to achieve a desired optical property. Examples of such optical components include, but are not limited to, thin films, coatings, dopants, modulators, filters, and the like. For example, the sleeve may be coated with an anti-reflective coating such as magnesium fluoride ($MgF_2$), titanium dioxide ($TiO_2$), silicon dioxide ($SiO_2$), or cesium oxide ($Cs_2O$). The anti-reflective coating may also function to cool and minimize thermal transfer to the environment surrounding the sleeve.

The sleeve material may include a dopant in order to alter the physical properties of light to create various effects, including filtering, wavelength shifting, or interference. Dopants useful for altering optical properties include, but are not limited to one or more of titanium (Ti), caesium (Cs), magnesium (Mg), boron (B), phosphorous (P), aluminum (Al), arsenic (As), gallium (Ga), and antimony (Sb). Another example of a useful dopant is a crystal that acts as an optical waveguide and shifts infrared radiation into green light, such as, periodically poled lithium niobate (PPLN Crystal).

The high intensity discharge light source may include spacer clips that surround the bulb and prevent it from directly contacting the inner surface of the sleeve and provide a well-defined and reliable separation distance between the bulb outer surface and sleeve inner surface. The spacer clips may by separate components that support the bulb within the sleeve through spring tabs which simultaneously contact the inner surface of the sleeve and the outer surface of the bulb. Alternatively, other objects may be used to support the bulb such as O-rings, sealing discs, or other similar structures. Alternatively, the spacers may from an integral part of the system, such as integrated with the sleeve and/or the bulb so that the spacers are not considered separate stand-alone components. For example, the integral spacer may correspond to a portion of the sleeve that protrudes toward and makes contact with bulb, or a portion of the bulb that protrudes toward and makes contact with the sleeve, such as by a relief feature comprising a plurality of protrusions or a raised ring. Alternatively, the spacer may be a gasket. The contact portions may be at the bulb/sleeve ends so as to minimize optical interference while avoiding direct contact between the bulb and sleeve. The spacer may comprise a thermally insulative material or a thermally insulative portion to further reduce heat flow between the bulb and sleeve.

In an aspect, the light source comprises a first and second end spacer to physically separate the bulb from the sleeve by a separation distance, wherein the separation distance is selected from a range that is greater than or equal to 1 mm and less than or equal to 10 cm to form an insulated optical volume. This configuration is useful for maintaining a bulb operating temperature within a desired range.

Any of the high intensity discharge light sources described herein may be configured to connect to an optical reflector used for illumination, including for indoor plant growth. A challenge in the art arises from the cooling of optical reflectors to avoid overheating of the environment without adversely affecting output light due to changes in output spectrum as the bulb temperature changes. The high intensity discharge light sources described herein address this challenge. To further dissipate heat generated by the high intensity discharge light source, a flow of air may be introduced over the outer surface of the sleeve and through the interior volume of the reflector. Ideally, the sleeve creates two environments where outside the sleeve the airflow cools the surrounding environment, and inside the sleeve the bulb's optimal operating temperature is substantially maintained via the well-defined insulative volume formed between the bulb outer surface and sleeve inner surface, even during active-cooling outside the sleeve. This prevents the bulb output from decreasing due to a bulb temperature decrease when air to cool the reflector or remove heat is introduced. A microclimate corresponding to the insulative volume within the sleeve of the high intensity discharge light source is thermally maintained. In an aspect, the insulative volume is not air-tight in that a pressure difference relative to the environment is not maintained. However, the insulative volume, particularly with the spacer clips, ensures that significant venting through the insulative volume due to convection or air-flow is minimized or avoided.

In an aspect, a source of cooled air that flows over the outer surface of the sleeve maintains an insulative volume within 20% of a desired operating temperature during use of the light source, and the interior volume/environment surrounding the sleeve has an average temperature that is less than or equal to a user-desired environmental temperature, such as about 75° F. or 70° F. In this manner, the precise desired bulb operating temperature can be elevated to a temperature, so long as the environmental temperature is not adversely impacted. To ensure the environmental temperature is not impacted, the light system may include a means for cooling, including by any of the structures provided herein around air-cooling, liquid-cooling, or a combination of air and liquid cooling. See, e.g., PCT/US2015/028803 and FIGS. 6, 23-25 herein.

The light source may be a longitudinally aligned light source that has a longitudinal axis aligned with a longitudinal axis of an optical reflector. Any of the various light sources are connected, directly or indirectly, to a top central section of the optical reflector, such as an optical reflector of PCT/US2015/028803.

The high intensity discharge light source may further comprise one or more electrical connectors on the bulb for interacting with electrical sockets and providing an electrical connection. A two-ended bulb may have an electrical connector on each end.

The HID bulb may be a high pressure sodium bulb or a metal halide bulb.

Also provided are methods of dissipating heat generated from any of the HID light sources provided herein, such as by introducing a flow of air through an interior volume of an optical reflector in which the HID light source is positioned. In contrast to conventional systems, this airflow is directed over the outer surface of the sleeve and not the insulative volume that surrounds the bulb, thereby ensuring the bulb operating temperature is substantially constant and at an elevated temperature. For example, the elevated temperature that is substantially constant refers to a less than 5% decrease in temperature, even under maximum cooling conditions. Similarly, the force airflow may be defined relatively between the volumetric flow rate that is maintained outside the sleeve compared to the amount forced inside the sleeve and through the insulative volume. For example, the amount that flows through the insulative volume may be less than 10%, less than 5%, less than 1%, less than 0.5%, or less than 0.1% of the amount flowing outside the sleeve. In this manner, desirable cooling is achieved without having to form an air-tight seal of the thermal insulative volume to the surrounding environment.

Accordingly, the high intensity discharge light source may have a thermally insulative volume with an opening to a surrounding environment. The opening may be configured to minimize convective cooling generated by air flow from the surrounding environment to the bulb outer surface. The opening may comprise a slot in a socket connected to the bulb first end and a tight-fit connection between the spacer and the sleeve inner surface and between the spacer and the bulb outer surface. The tight-fit is in contrast to an air-tight fit, in that air may flow-through. A second opening may be positioned at the bub second end.

Also provided herein are spacer clips, such as a spacer clip that is used to reliably position a HID light source in a lumen of any of the thermally insulative and optically transparent sleeves provided herein. The spacer clip may be made of any material that is compatible with the operating conditions of the light source and environment in which the light source is utilized. Examples of suitable materials include, metals, plastics and composites. In an aspect, the spacer clip comprises a ring member having an outer edge and an inner edge, with a plurality of protruding members circumferentially arranged around the outer and inner edge. The outer edge protruding members are configured to reliably contact the spacer clip with the inner surface of the sleeve. The inner edge protruding members are configured to reliably contact the spacer clip with the light source. In this manner, the spacer clip can be positioned in a tight-configuration between the sleeve and the light source, thereby reliably providing a well-defined insulative distance between the light source outer surface and the sleeve inner surface. In this aspect, "reliably" refers to the ability to position the bulb from the sleeve, such that unwanted relative motion between the bulb and sleeve is avoided, while maintaining the well-defined separation to provide a well-defined separation distance.

Also provided herein is a method of increasing photosynthetic photon flux density (PPFD) or photosynthetic active radiation (PAR) to a target light area comprising the steps of: positioning a high intensity discharge light source within a quartz sleeve inner volume; and energizing the high-intensity discharge light source to reach an elevated steady state operating temperature to illuminate said target light area; wherein the target light area experiences an at least 5% increase in PPFD or PAR compared to the high-intensity discharge light source without the quartz sleeve.

Any of the light sources described herein may be used with any of the spacer clips described herein, thereby providing a light source reliably positioned in a lumen of a thermally insulative and optically transparent sleeve, such that there is a desired insulating distance between the bulb outer surface and sleeve inner surface. In an embodiment, a pair of spacer clips is employed with a longitudinally extending light source, with a first spacer clip at or toward a first end of the light source and a second spacer clip at or toward a second end of the light source.

The light source is selected from the group consisting of incandescent, fluorescent, high intensity discharge (HID) including metal halide, high-pressure sodium or mercury vapor, one or a plurality of LEDs, or the like. The light source may run hot, so that any of the cooling aspects described herein are required to avoid adversely-high temperature increases in the environment around the bulb, without sacrificing the bulb spectral performance parameter.

Also provided herein is a longitudinally aligned light source surrounded by a quartz sleeve, such as a light source that is a high-pressure sodium light source.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 19. Summary table of PPFD outputs from FIGS. 11-18.

FIG. 22. Summary table of parameters and average PPFD outputs from FIG. 20 illustrating various improvements in spectral performance parameter.

DETAILED DESCRIPTION OF THE INVENTION

Figure 1:
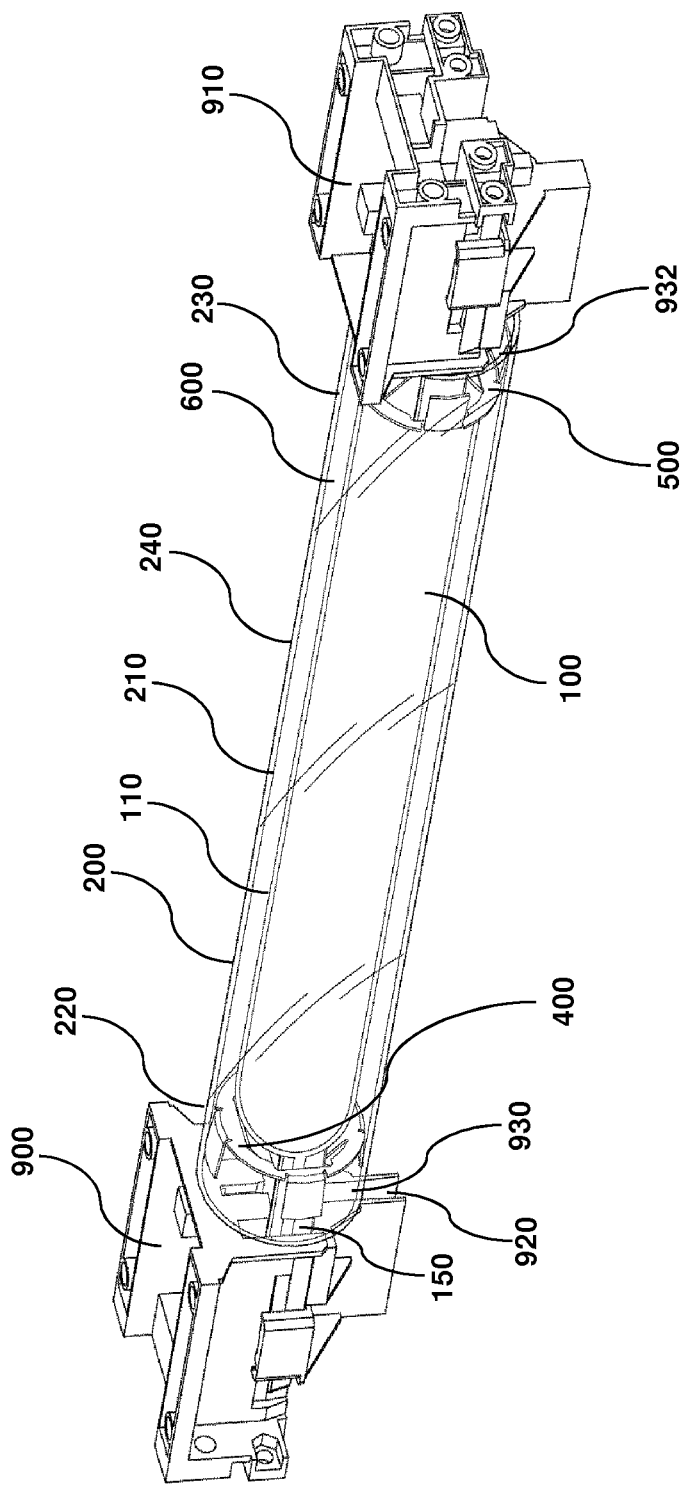
FIG. 1. Perspective view of a HID light source with a bulb and a sleeve that surrounds the bulb.

In general, the terms and phrases used herein have their art-recognized meaning, which can be found by reference to standard texts, journal references and contexts known to those skilled in the art. The following definitions are provided to clarify their specific use in the context of the invention.

"High intensity discharge light" refers to electrical gas-discharge lamps. In an aspect, the high intensity discharge light is a plant grow light that supplements existing light or is a sole source of light used to grow plants in an indoor environment. In an aspect, the HID light is a metal halide (MH), a high-pressure sodium (HPS), or a combination of the two, with certain lights that are MH and others that are HPS arranged in a desired geometric configuration. In an aspect, the HID lights are selected to provide about 20 to 50 watts/foot$^2$ of plant canopy. The lights may be separated from the plant canopy at a vertical distance that is between about 0.5 and 6 feet. The HID light may also be described in terms of any one or more geometrical parameters. In an aspect, the HID light contains a cylindrical and longitudinally extending bulb, such as a bulb having a diameter that is between 0.5 cm and 10 cm and a length that is between 5 cm and 2 m. In an aspect, the thermally insulative and optically transparent sleeve is correspondingly cylindrical to envelope the outer surface of the cylindrical and longitudinally extending bulb, but with an insulative volume of air positioned therebetween, as defined by the separation distance between the bulb outer surface and the sleeve inner surface.

Referring to the positioning of the bulb within the sleeve, the term "concentrically positioned" means that the cross-sections of the bulb and the sleeve share the same center point. The systems can tolerate deviations from absolute concentricity, including by up to 20% from absolute concentricity, so long as the bulb outer surface and sleeve inner surface are not in physical contact. "Eccentrically positioned" means that the bulb and sleeve do not share the same center point. The outer surface of a bulb that is eccentrically positioned should also not touch the inner surface of the sleeve.

The term "electrical connector" refers to the plug of the bulb that establishes an electrical connection to energize and illuminate the bulb. The electrical connector and socket may be connected by any means known in the art for providing a reliable electrical connection to the bulb, including by a tight-fit contact between leads and sockets.

As used herein, "adjacent" refers to the positioning of the spacer clips such that they are capable of reliably supporting the bulb at a desired separation distance from the sleeve inner surface as described herein. To minimize adverse impact on illumination output, the spacer clips may contact the bulb in a region that does not illuminate, such as outside a gas region of the lamp. Adjacent encompasses use of an intervening component, such that the spacer clip itself does not directly contact the bulb. For example, a support element may extend from a bulb end wherein the support element contacts the spacer clip.

As used herein, the term "spring tab" refers to a portion of the spacer clip that has two members connected in a flexible manner such that the angle created between the two members can be changed by applying pressure. In order to support the bulb within the sleeve component, one member of the spring tab is positioned to contact the bulb, while the other is positioned to contact the sleeve.

The "insulating volume" may be established by the addition of spacers to stably position the bulb within the sleeve and form a microenvironment such that heat from the bulb is insulated within the sleeve. It is defined by the "insulating distance," the distance between the outer surface of the bulb and the inner surface of the sleeve, multiplied by the length of the bulb between the two spacers. The insulative volume facilitates an increase in operating temperature of the HID light source, which in turn provides an increase in a spectral performance parameter compared to an equivalent light source without the sleeve. For an eccentrically positioned light source, the separation distance may be described as an average separation distance that is calculated from the insulative volume and the length of the HID bulb.

With respect to the term "without substantially flowing air", that term may be defined quantitatively, such as less than 5%, 1%, 0.1% or 0.05% of the forced air flow over the sleeve outer surface that transits the insulative volume, that is to say very little air that acts to directly cool the bulb surface. Such air-flow is avoided, so as to not significantly adversely impact bulb operating temperature during use and airflow. Accordingly, the term may also be defined functionally, such as resulting in a less than 10%, less than 5%, less than 1%, or less than 0.5% change in bulb operating temperature. Similarly, the lack of air flow, referred herein generally as without substantial airflow, may also be assessed in terms of a spectral performance parameter that does not decrease with airflow. In contrast, substantial airflow over the bulb surface may result in detectable or measurable drop in the spectral performance parameter, such as a bulb whose operating temperature has decreased.

Referring to the alignment of the bulb within the sleeve, the term "longitudinally aligned" means that the axes of the bulb and sleeve are aligned substantially parallel to each other, such as within 20°, within 10°, within 1°, or that is parallel.

The term "optical reflector" broadly refers to a housing in which the light source is positioned and that can reflect light onto a desired target area. For example, U.S. Provisional App. Nos. 61/987,905, 62/052,890, and 62/078,267 and U.S. Design application Nos. 29/506,651, 29/506,653, 29/506,654, and 29/508,801 describe optical reflectors that can be used with any of the HID light sources and methods described herein, and are specifically incorporated herein by reference.

With respect to the sleeve, the term "optically transparent" refers to a material that light in the visible spectrum, or PAR can pass through. The material may transmit at least 90%, 95% or 98% of electromagnetic radiation in the visible spectrum or a user-defined wavelength range.

The term "photosynthetically active radiation" or "PAR" is the spectral range of radiation from 400 to 700 nanometers that photosynthetic organisms are able to use during photosynthesis. It can be measured and quantified as µmol photons/m$^2$/s, which is a measure of the "photosynthetic photon flux density," or "PPFD." PPFD is a measure of the number of photons in the 400 nm to 700 nm range of the visible light spectrum.

As used herein, "spectral performance parameter" refers to a quantitative measure of optical output, and accordingly may relate to an optical intensity (e.g., maximum, average, distribution over a target area), photon flux, spectral waveform (intensity as a function of wavelength), wavelength maximum, or any other feature of interest. A relevant specific spectral performance parameter may depend, in part, on the application of interest. For example, a relevant spectral performance parameter for a plant grow application is a parameter that is important to plant growth, such as PAR or PPFD. For room illumination, intensity at a specific color wavelength of interest may be of higher relevance.

Example 1: High Intensity Discharge Light Source

Provided herein are specially configured optical light sources, wherein a bulb is positioned within a sleeve, such as a quartz sleeve. This facilitates an increase in light intensity provided to the plant canopy, allows cooling of the light source without spectrum shift by flowing air, including cooled air, over an exterior facing surface of the sleeve, and increases safety in the event of a catastrophic light source failure such as a melt-down or explosion. Examples include an optical light source comprising a quartz sleeve that is separated from the outer surface of a bulb by a separation distance, wherein an inner surface of the quartz sleeve and the outer surface of the bulb define an insulative volume. This configuration is beneficial because the insulative volume increases an operating temperature of the bulb during use compared to an equivalent bulb without the quartz sleeve. This increase can occur even while the rest of the light source is activity cooled, such as by any of the cooling systems provided herein. The increase in operating temperature provides an at least 5% increase in light output compared to an equivalent bulb without the quartz sleeve. In an aspect, the quartz sleeve is resistant to optical light source explosion or melting. The bulb may be a high pressure sodium bulb.

Figure 2:
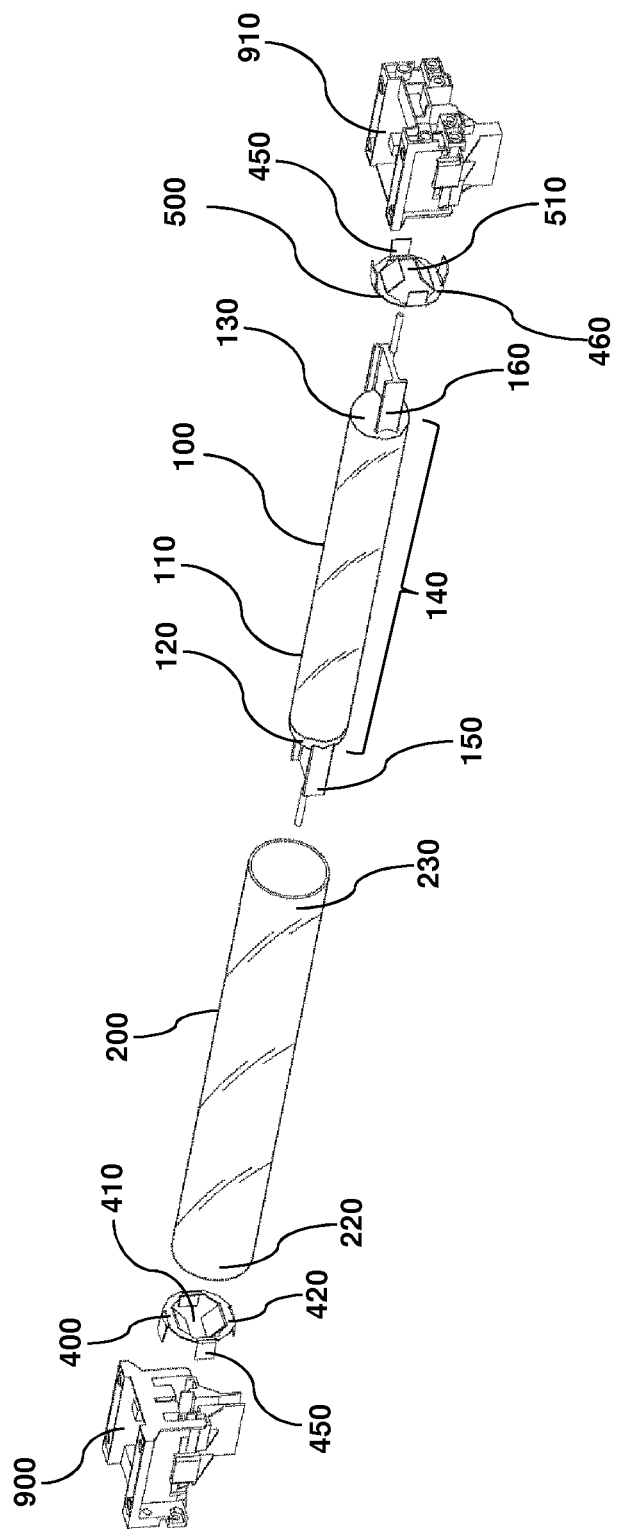
FIG. 2. Perspective view of the light source of FIG. 1 with various components illustrated separately for clarity.
Figure 3A:
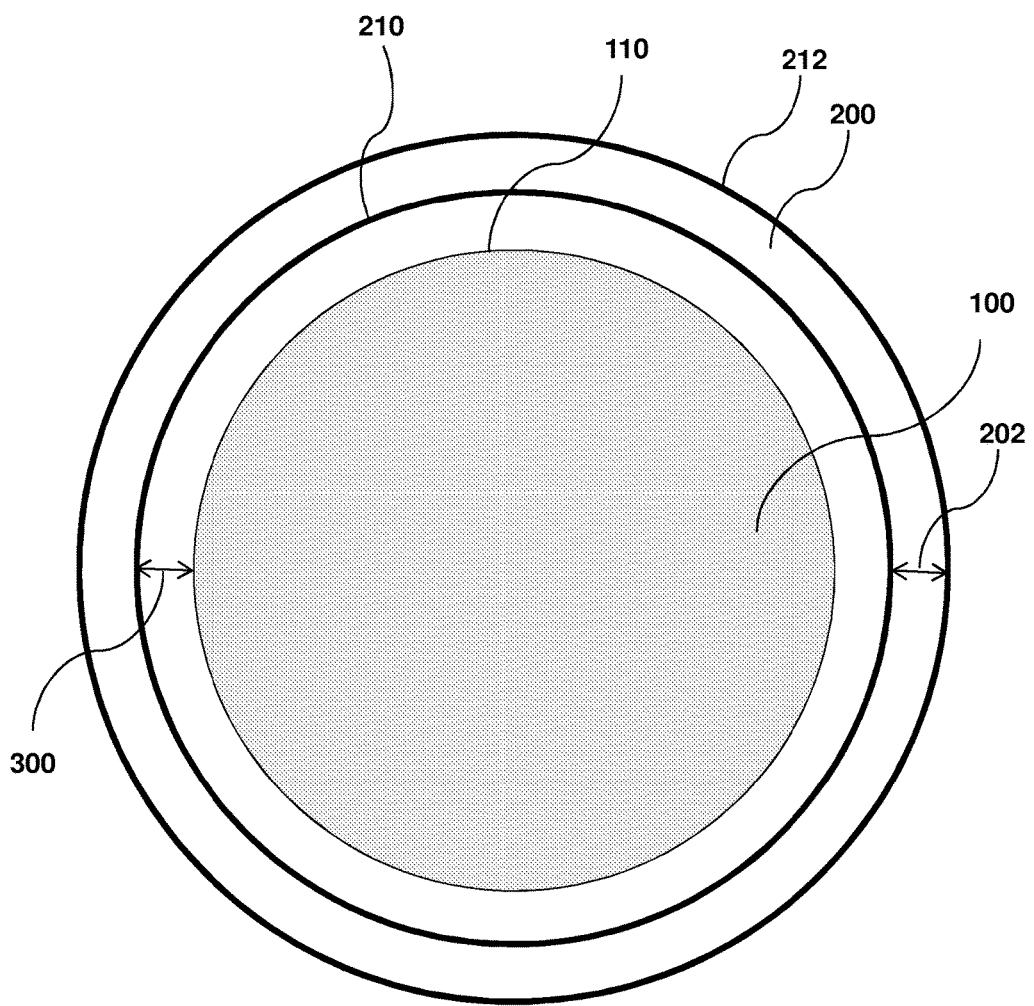
FIG. 3A. Cross sectional view of the bulb and sleeve in a concentric configuration.

Referring to FIGS. 1-3, a high intensity discharge light source may have a bulb 100 with an outer surface 110, a bulb first end 120, a bulb second end 130, and a bulb central region 140 that extends between the first 120 and second 130 ends. The bulb may also have a first electrical connector 150 and a second electrical connector 160. Alternatively, the bulb may be configured to have only one electrical connector. FIG. 3A is a cross-sectional view illustrating a thermally insulative and optically transparent sleeve 200 having a sleeve thickness 202, outer surface 212, and inner surface 210 that is longitudinally aligned with and separated from the bulb outer surface 110 by an insulating distance 300. In the illustrated embodiment, the bulb is concentrically positioned inside the sleeve. In an embodiment, the bulb is a high pressure sodium (HPS) bulb. Alternatively other high intensity discharge light bulbs may be used, such as metal halide bulbs or the like.

As illustrated in FIGS. 1 and 2, the bulb 100 is connected to and separated from the sleeve 200 by spacer clips, such as a first spacer clip 400 having a first annular opening 410 and a second spacer clip 500 having a second annular opening 510, the annular openings 410 and 510 for receiving the bulb first end 120 and second end 130, respectively. The spacer clips 400 and 500 are positioned adjacent to the bulb ends 120 and 130, and between the bulb outer surface 110 and the sleeve inner surface 210, providing an insulating distance 300 that is at or between 1 mm and 10 cm. FIGS. 2 and 3. As depicted in FIG. 1, the addition of the spacer clips provides an insulative volume 600, defined as the insulating distance 300 multiplied by the length of the bulb 100 between the spacer clips 400 and 500. In embodiments having an eccentrically positioned bulb, an average insulating distance is used to determine the insulative volume. This configuration is beneficial because the insulative volume increases the operating temperature of the light source during use compared to an equivalent light source without a sleeve that functions as an insulative barrier relative to the light source and surrounding environment. In an embodiment, the sleeve is made of quartz. However, any lead-free glass may be used.

Figure 3B:
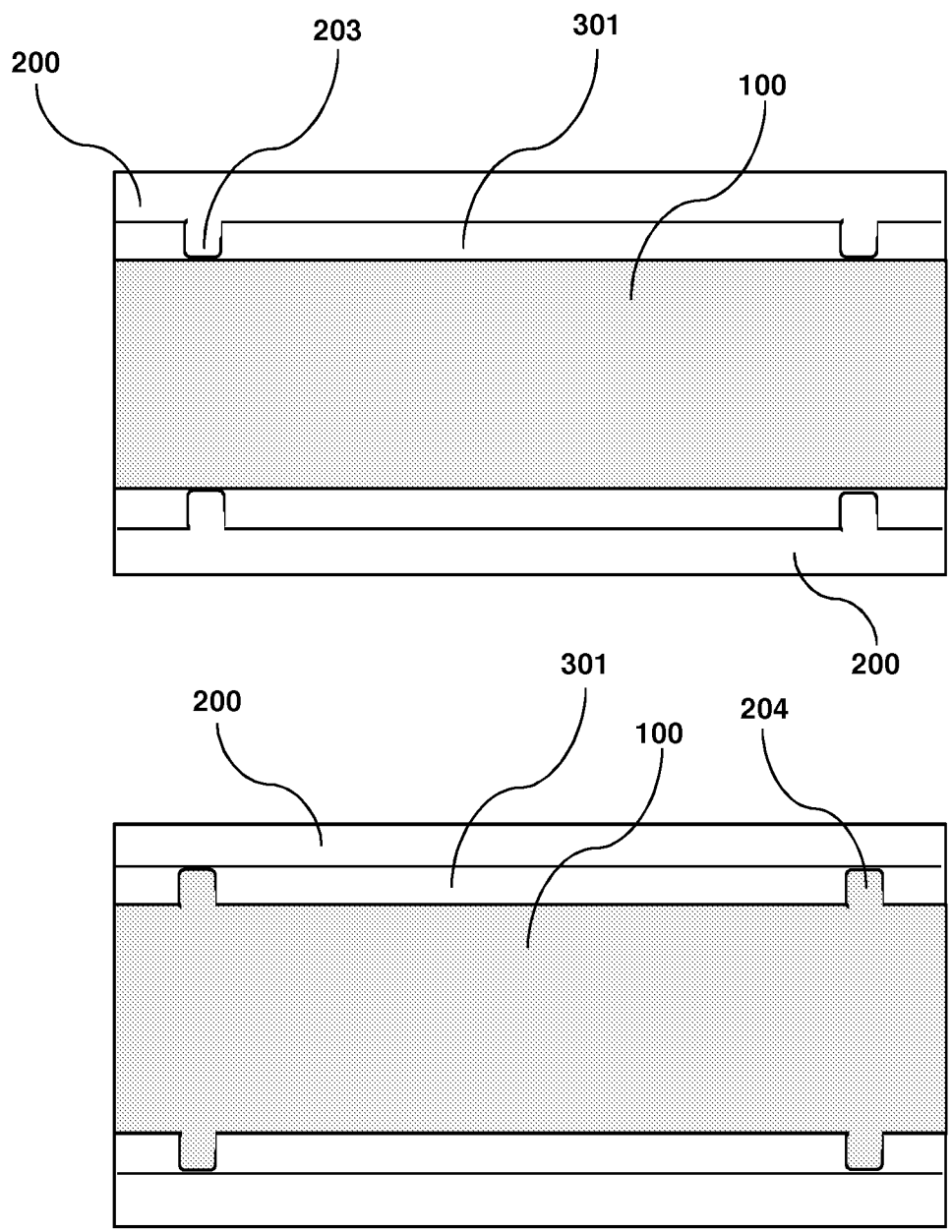
FIG. 3B. Illustration of integrated spacers, including integrated with the sleeve (top panel) and the bulb (bottom panel). The sleeve may have point protrusions or may be a ring running along the outer/inner circumference of the bulb or sleeve, respectively.
Figure 4:
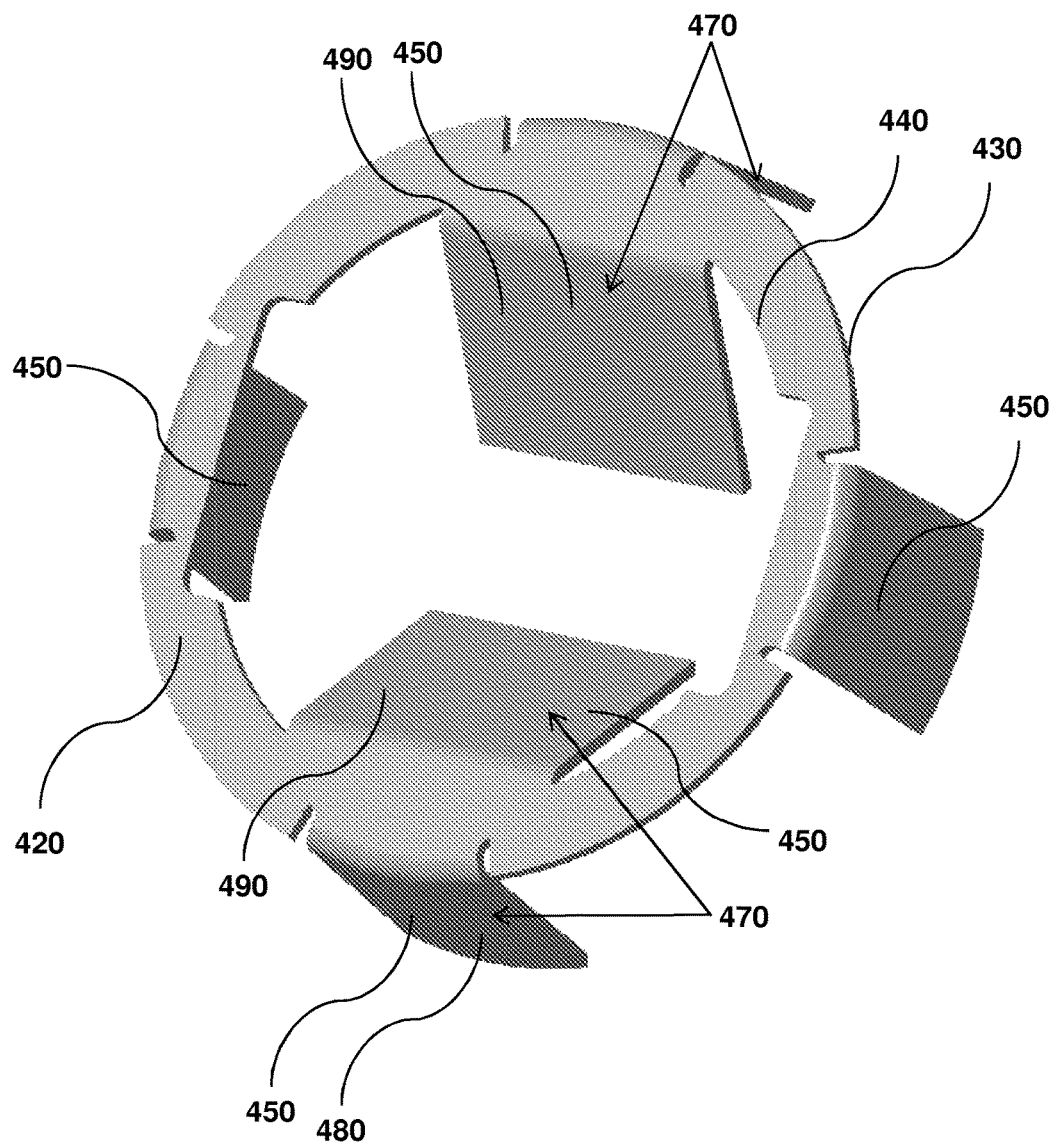
FIG. 4. Perspective view of a spacer clip used to reliably position and separate a sleeve from a light source.
Figure 5:
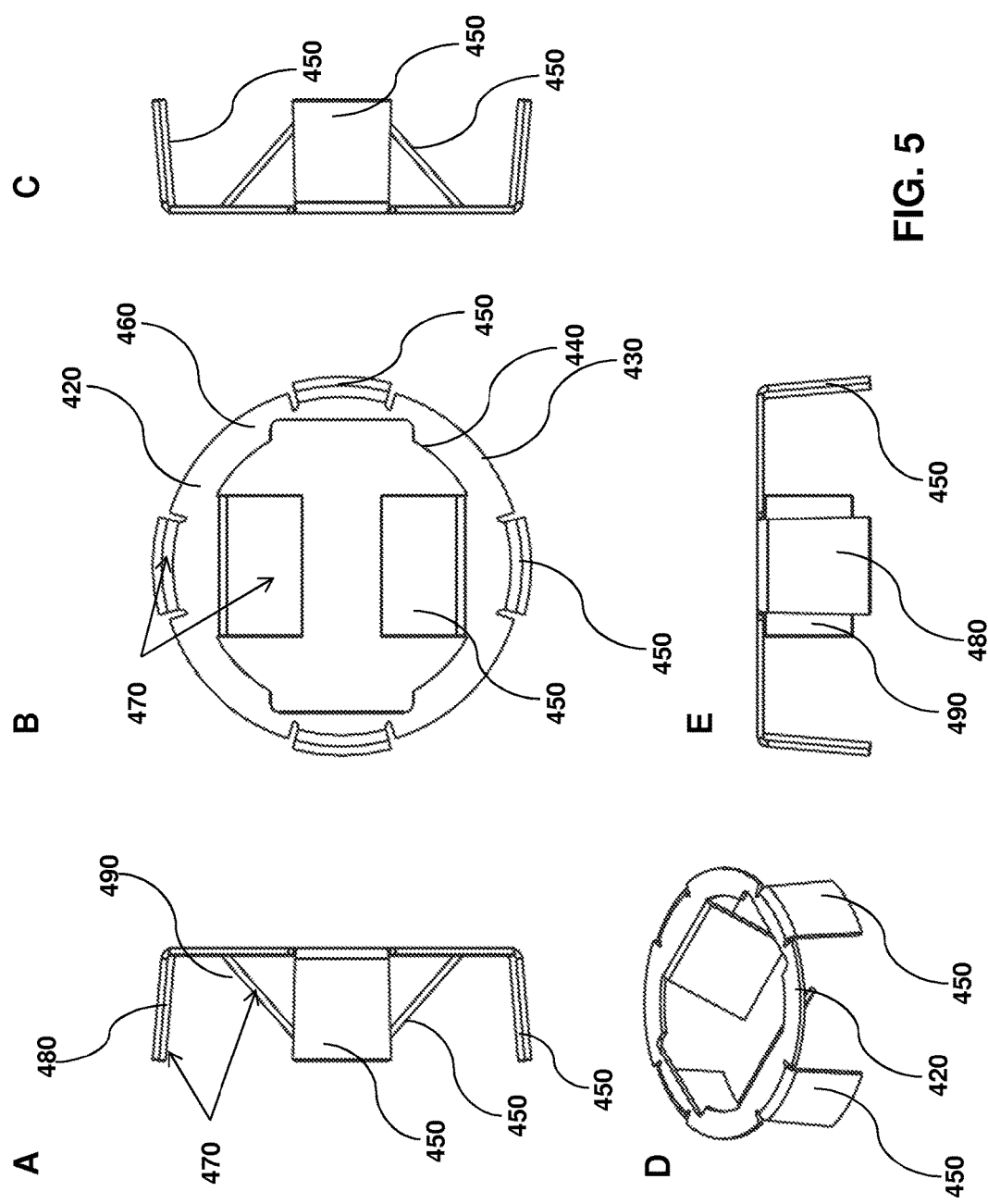
FIG. 5. Various views of the spacer clip of FIG. 4. (A) Side view with inner members of spring tabs visibly deployed. (B) Top view (C) Side view. (D) Top perspective view. (E) Side view.

FIG. 3B illustrates a bulb 100 and sleeve 200 with integral spacers (203, 204). The sleeve 200 may be configured to have integral sleeve spacers 203 which protrude outward from the sleeve to meet and support the bulb 100 (upper panel). Alternatively, the bulb 100 (or ends thereof) may be configured to have integral bulb spacers 204, which protrude outward from the bulb to meet the sleeve 200. The spacers may be rings or point-contacts, so long as a desired separation distance is maintained and corresponding insulative volume 301. As shown in FIGS. 1, 2, 4, and 5, each spacer clip 400 and 500 may be formed by a ring member 420, an outer edge 430, an inner edge 440, and a plurality of protruding members 450 that are circumferentially spaced along the ring member or outer facing surface 460. As shown in FIG. 3A-3B, the protruding members may be in the form of outer and inner protruding members to aid in supporting the bulb 100. The protruding members may be in the form of spring tabs 470, having two members, an outer member 480 that contacts sleeve inner surface 210 and an inner member 490 that supports the outer surface 110 of the bulb 100. In the illustrated embodiment, each spacer clip 400 and 500 has two spring tabs 470. FIGS. 4-5. For additional support and contact with the sleeve inner surface, protruding members 450 may be used. In the illustrated embodiment, there is an alternating positioning of protruding members 450 and spring tabs 470, such as with equivalent circumferential spacing. In other embodiments, the spacer clips may have any number of members for supporting the bulb. Alternatively, an O-ring, a sealing disc, or any other similar structure may be used to separate the bulb from the sleeve, so long as the separation is reliable and does not degrade over time, and under relatively high operating temperatures.

FIGS. 1-2 illustrate a light source having a first socket 900 and a second socket 910 that contact a sleeve first end 220 and a sleeve second end 230, respectively; and electrically connect the bulb first electrical connector 150 and bulb second electrical connector 160, respectively. Alternatively, the light source may have only one socket for electrically connecting the bulb. Any of the high intensity discharge light sources may be used in numerous devices. For example, referring to FIG. 6, the light source may be configured to connect to an optical reflector 1000 used for indoor plant growth, such as by being positioned within an interior volume formed by the illustrated reflector walls. See also FIGS. 23-25 for specific examples of other optical reflectors. The HID light source of the present invention may be especially useful for this purpose as the configuration prevents the bulb's heat from escaping to the surrounding environment, while increasing output, including PPFD and PAR. The sleeve also protects the plants and surrounding environment from damage in the case of a bulb melt down or explosion.

Additionally, a flow of air 1100, including cooled air, may be introduced through an interior volume of the reflector 1000 and over an outer surface of the sleeve 240. The cooled air further prevents the light source, optical reflector, and the plant canopy from overheating. The air may be passively introduced, such as by vents (142 of FIG. 24) in reflector 1000 or forced air flow by fans through vent openings (113 114 of FIG. 23), and/or air blowers or fans 136 and liquid heat exchanger 130 (FIG. 25) including by any one or more embodiments illustrated in any of PCT App. No. PCT/US2015/028803 filed May 1, 2015, U.S. Pat. App. Nos. 61/987,905 (filed May 2, 2014), 62/052,890 (filed Sep. 19, 2014), 62/078,267 (filed Nov. 11, 2014), 29/506,651, 29/506,653, 29/506,654 (each filed Oct. 17, 2014) and 29/508,801 (filed Nov. 11, 2014), each of which is specifically incorporated by reference from the optical reflectors described therein.

Figure 6:
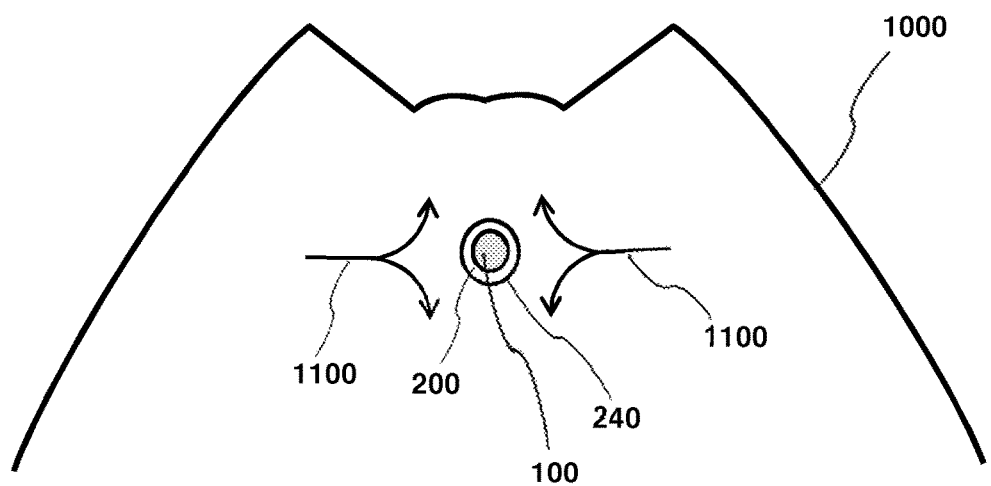
FIG. 6. Cross sectional view of the light source inside an optical reflector, with a flow of air over the outer surface of the sleeve that may subsequently flow out of the reflector (not shown) to dissipate thermal build-up within the optical reflector without substantially decreasing the operating temperature of the bulb.
Figure 7:
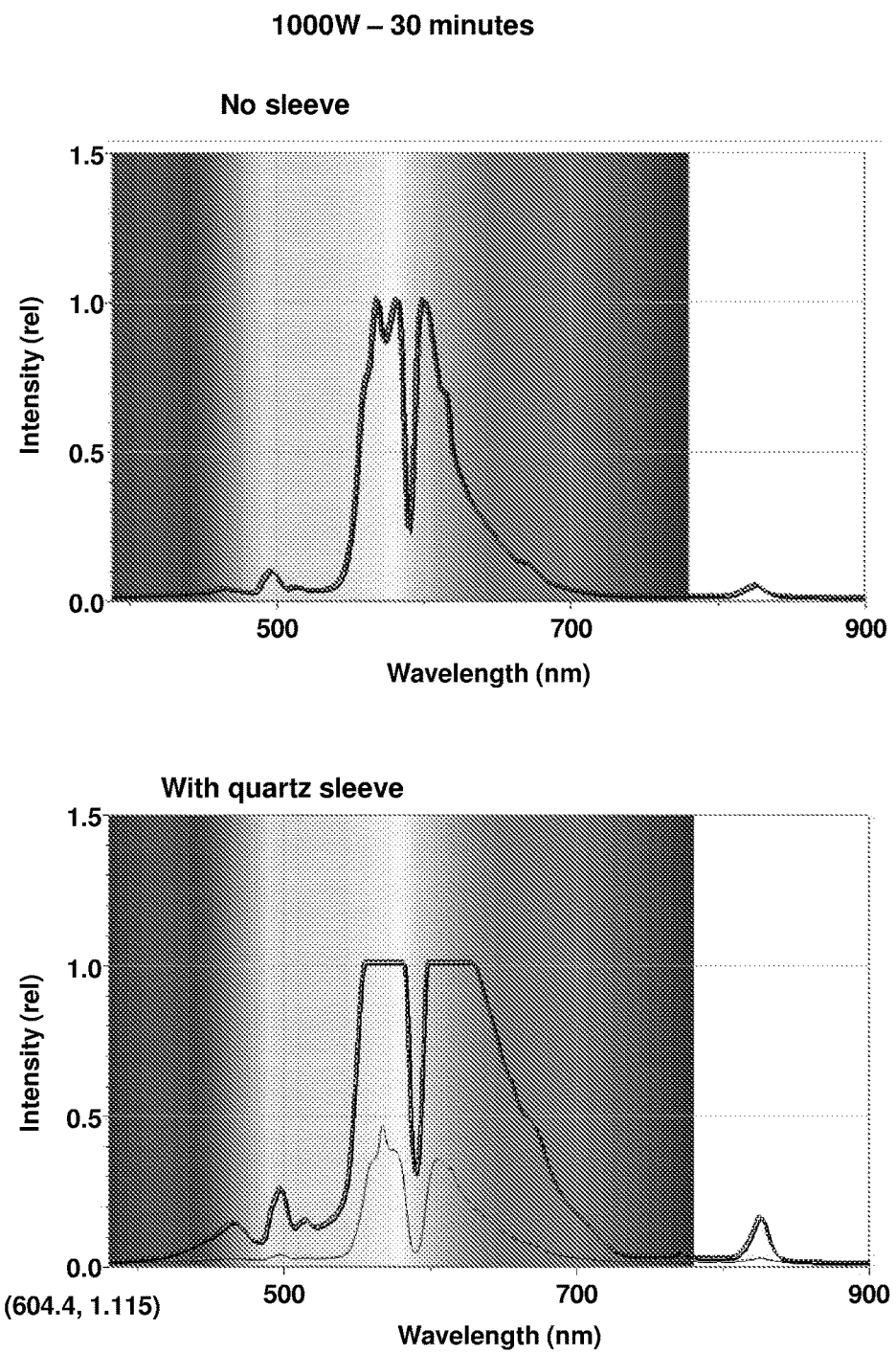
FIG. 7. Spectral comparison of 1000 W HPS bulb with (bottom panel) or without (top panel) a quartz sleeve after 30 minutes.
Figure 8:
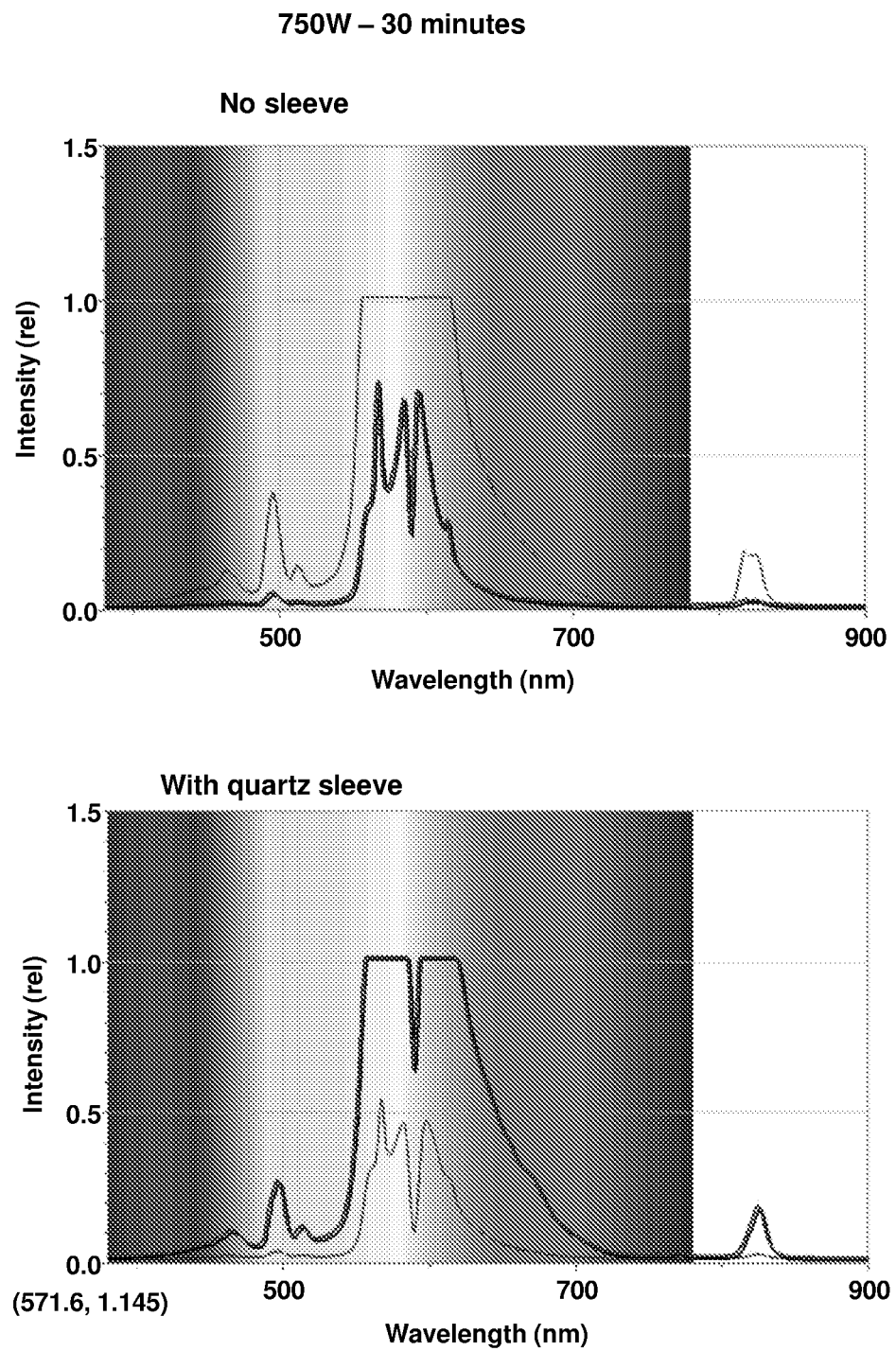
FIG. 8. Spectral comparison of a 750 W HPS bulb with (bottom panel) or without (top panel) a quartz sleeve after a 30 minute run time.
Figure 9:
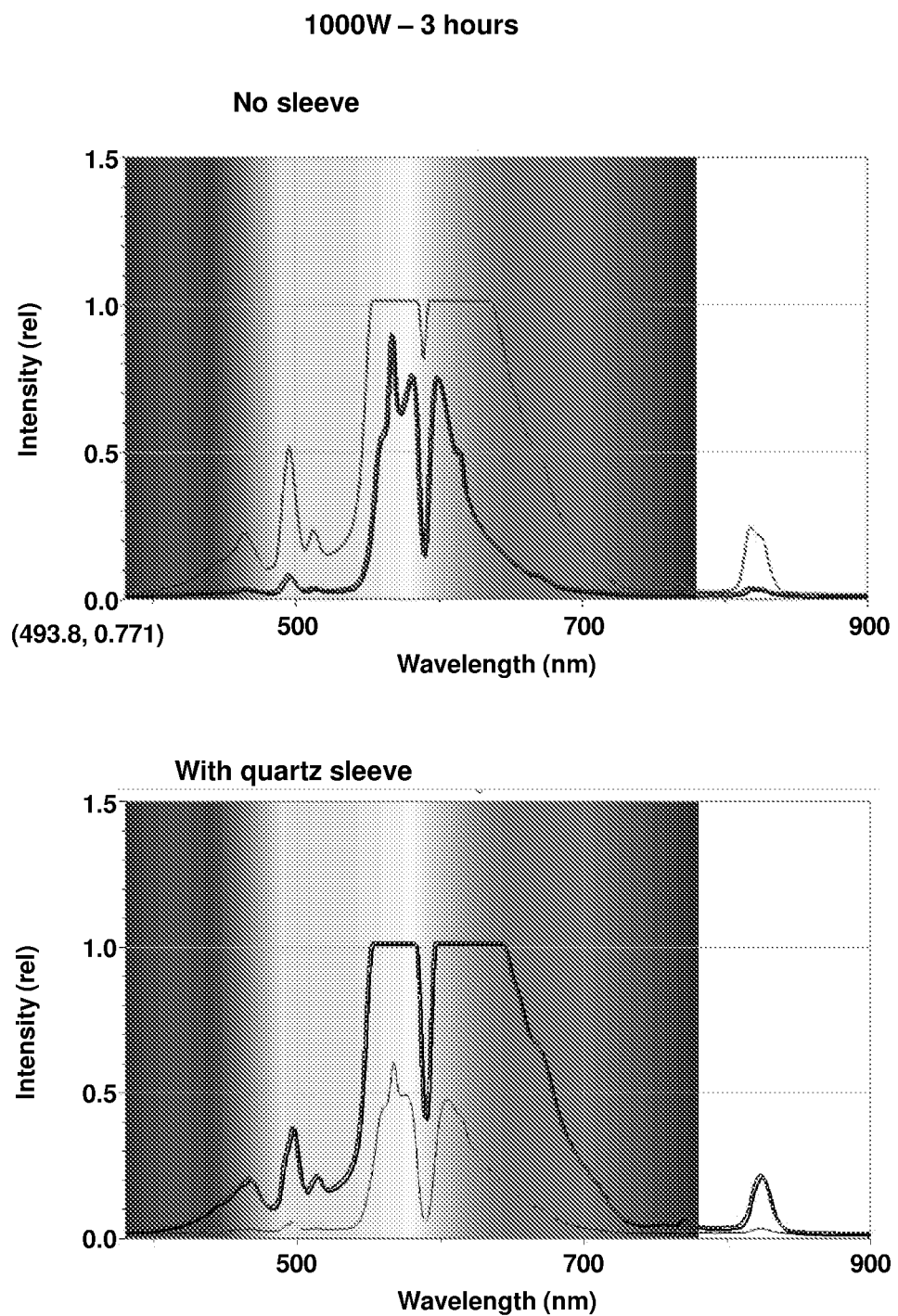
FIG. 9. Spectral comparison of a 1000 W HPS bulb with (bottom panel) or without (top panel) a quartz sleeve after a 3 hour run time.
Figure 10:
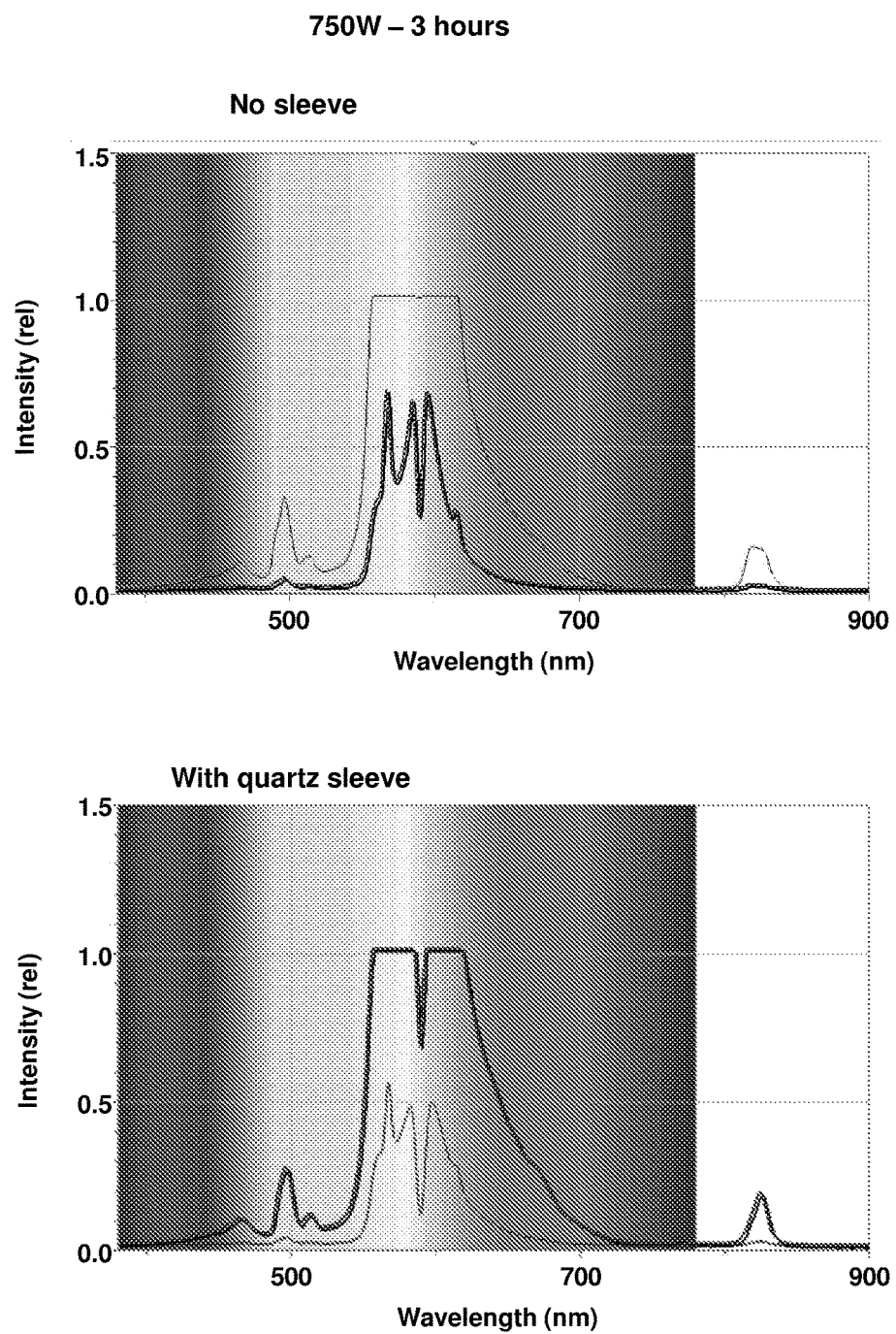
FIG. 10. Spectral comparison of 750 W HPS bulb with (bottom panel) or without (top panel) a quartz sleeve after a 3 hour run time.
Figure 11:
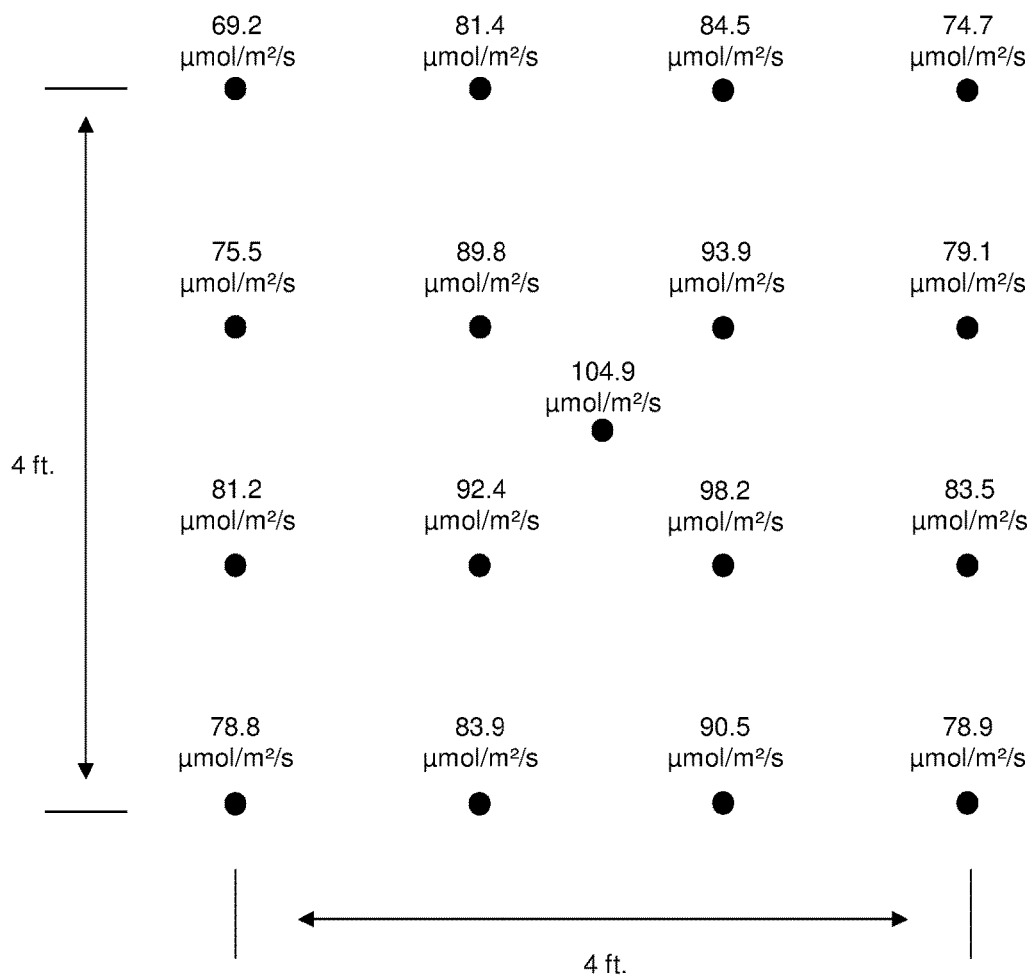
FIG. 11. PPFD plot over a 4 foot by 4 foot target light area for a 1000 W HPS bulb output in a conventional optical reflector without a quartz sleeve after a 30 minute run time.
Figure 12:
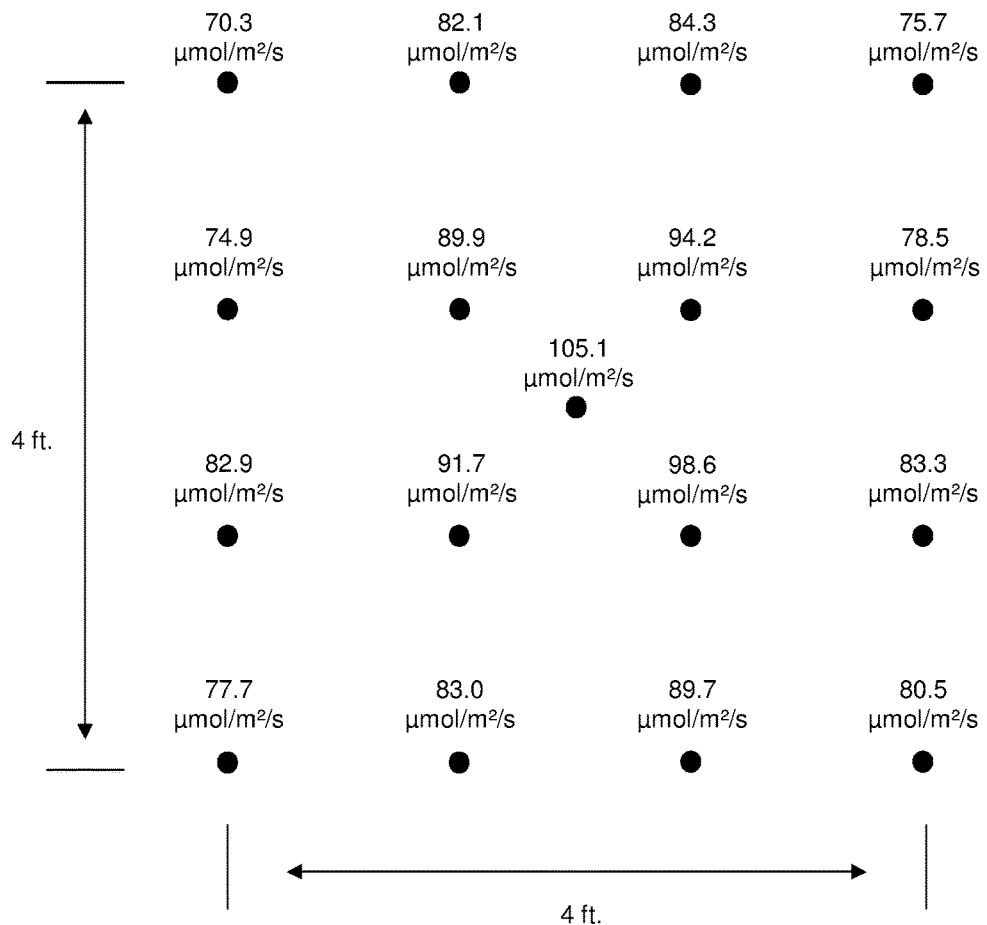
FIG. 12. PPFD plot over a 4 foot by 4 foot target light area for a 1000 W HPS bulb output in a conventional optical reflector without a quartz sleeve after a 3 hour run time.
Figure 13:
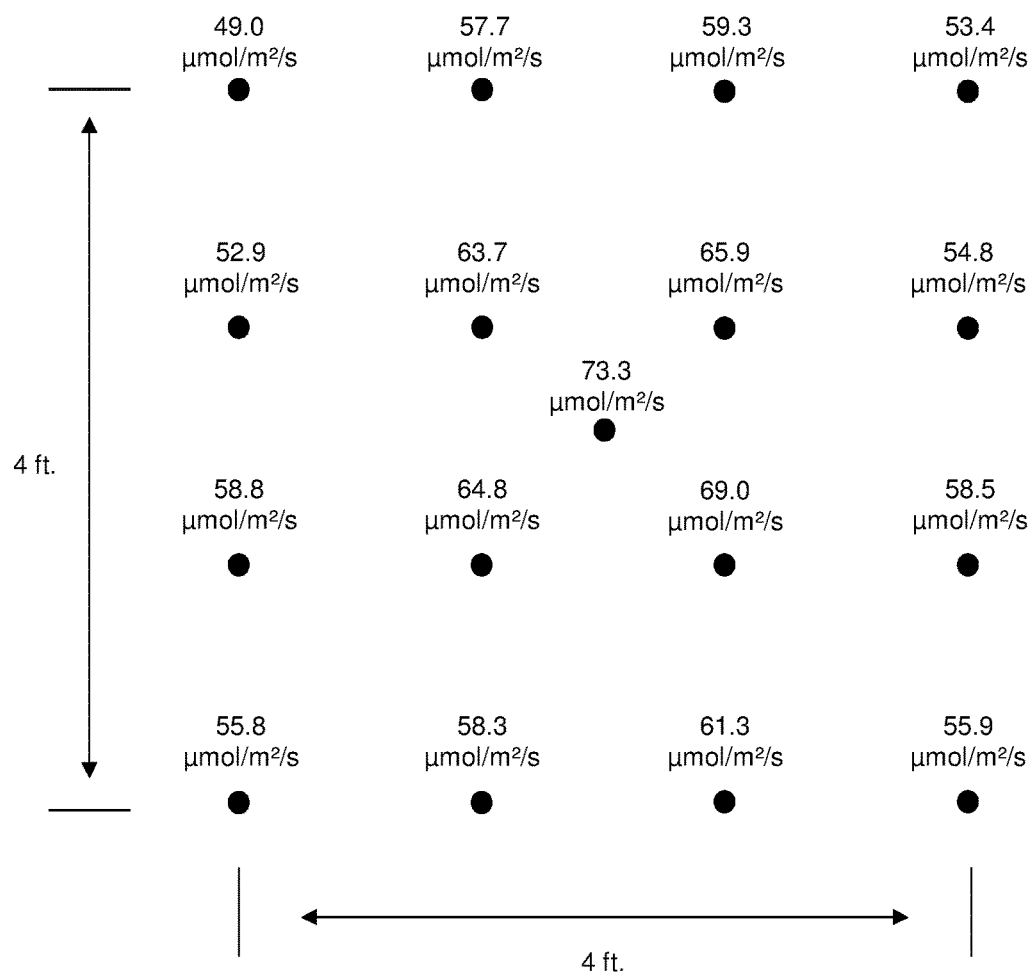
FIG. 13. PPFD plot over a 4 foot by 4 foot target light area for a 750 W HPS bulb output in a conventional optical reflector without a quartz sleeve after a 30 minute run time.
Figure 14:
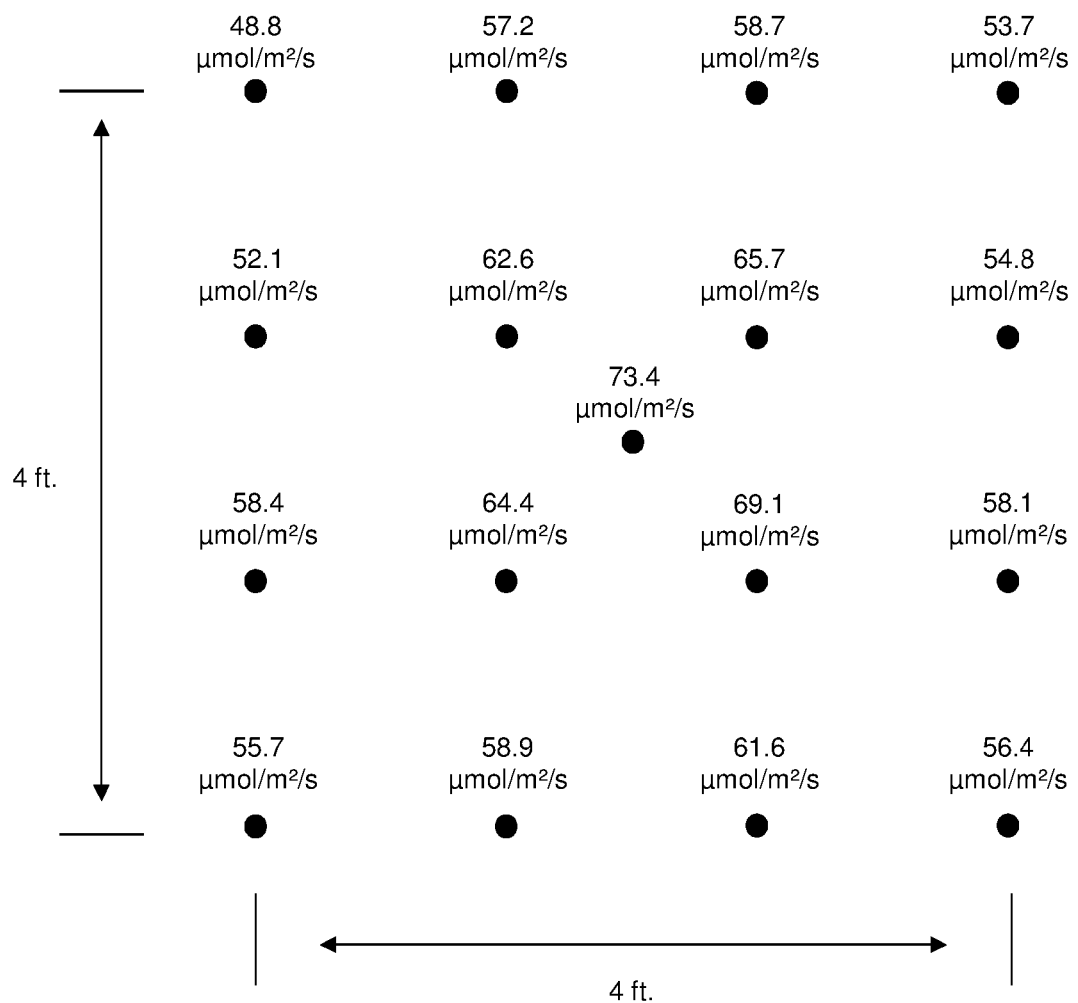
FIG. 14. PPFD plot over a 4 foot by 4 foot target light area for a 750 W HPS bulb output in a conventional optical reflector without a quartz sleeve after a 3 hour run time.
Figure 15:
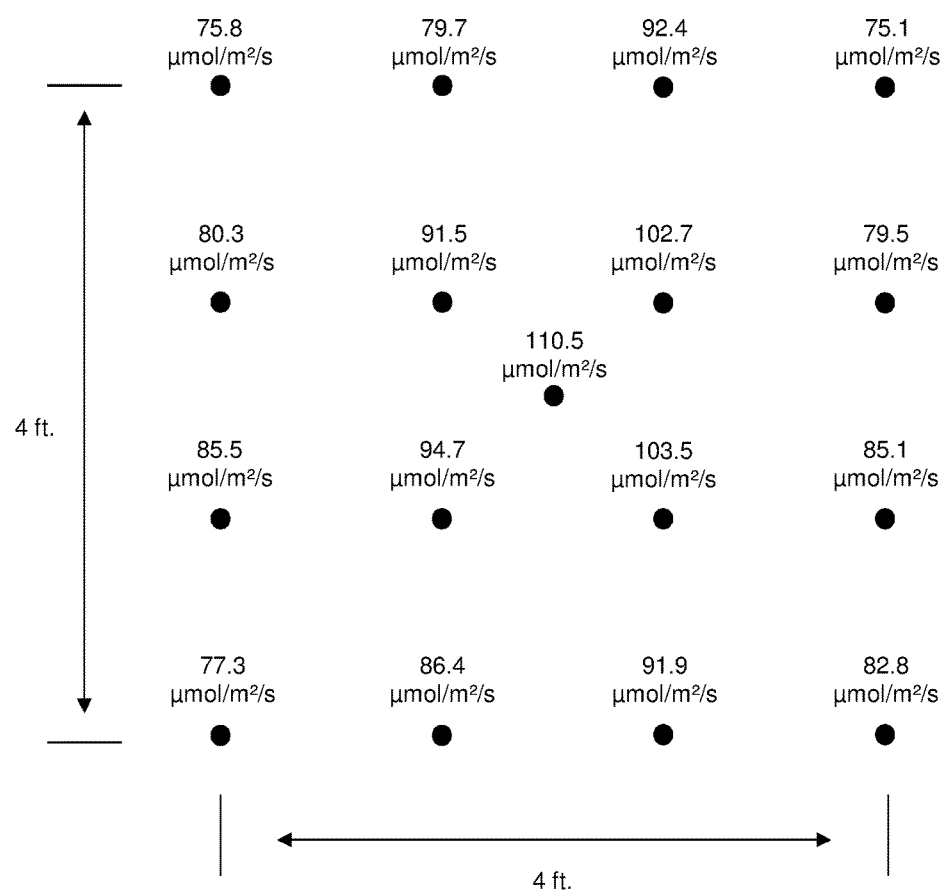
FIG. 15. PPFD plot over a 4 foot by 4 foot target light area for a 1000 W HPS bulb output in a conventional optical reflector with a quartz sleeve after a 30 minute run time.
Figure 16:
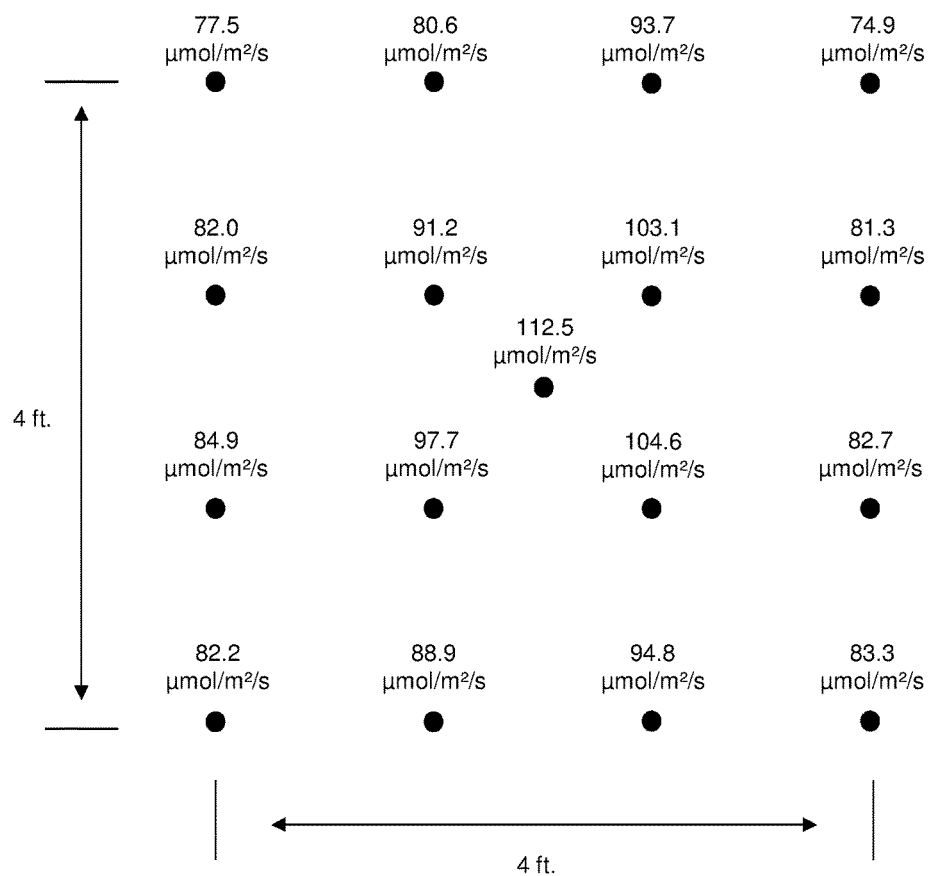
FIG. 16. PPFD plot over a 4 foot by 4 foot target light area for a 1000 W HPS bulb output in a conventional optical reflector with a quartz sleeve after a 3 hour run time.
Figure 17:
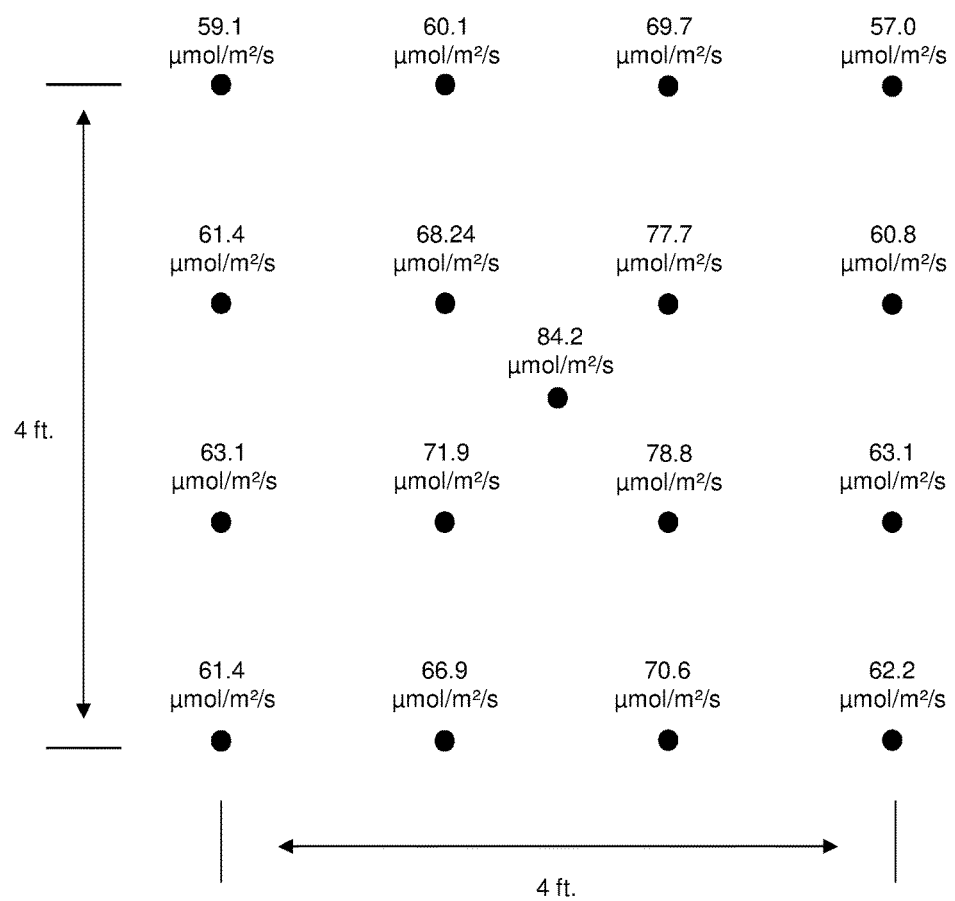
FIG. 17. PPFD plot over a 4 foot by 4 foot target light area for a 750 W HPS bulb output in a conventional optical reflector with a quartz sleeve after a 30 minute run time.
Figure 18:
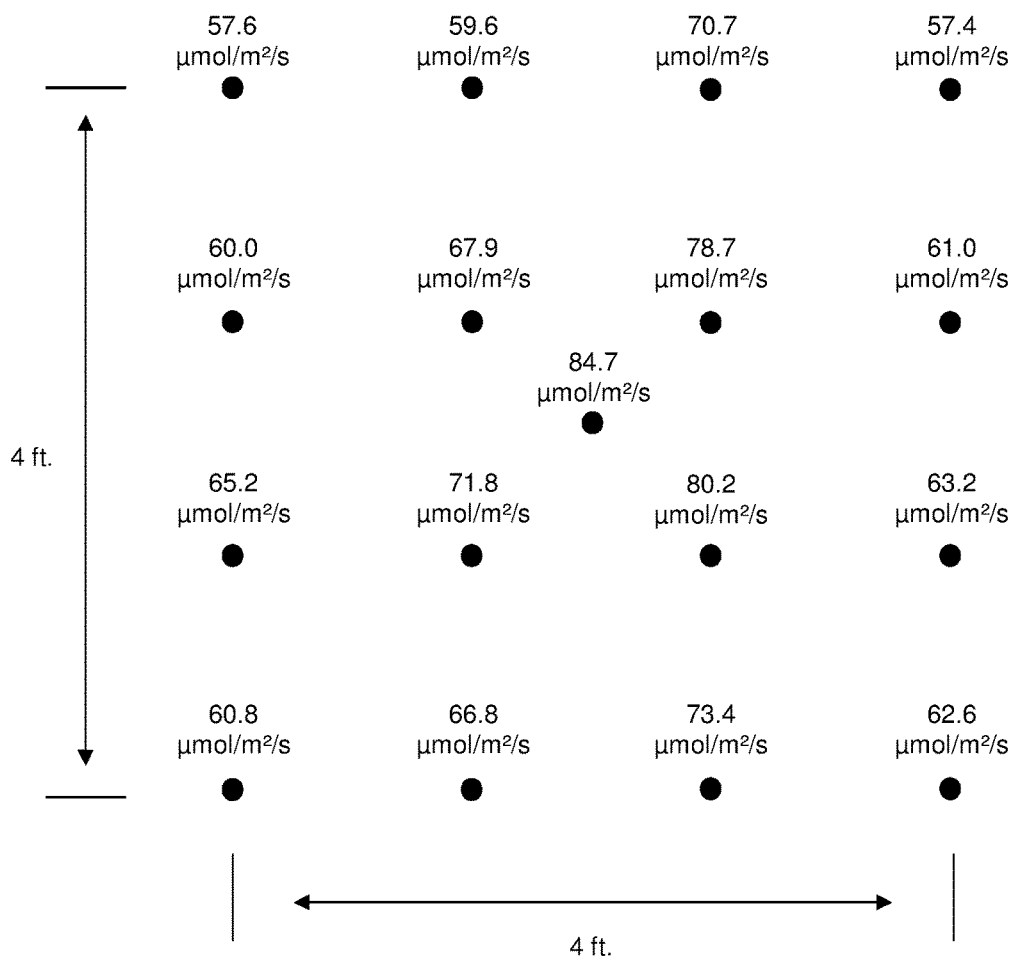
FIG. 18. PPFD plot over a 4 foot by 4 foot target light area for a 750 W HPS bulb output in a conventional optical reflector with a quartz sleeve after a 3 hour run time.
Figure 23:
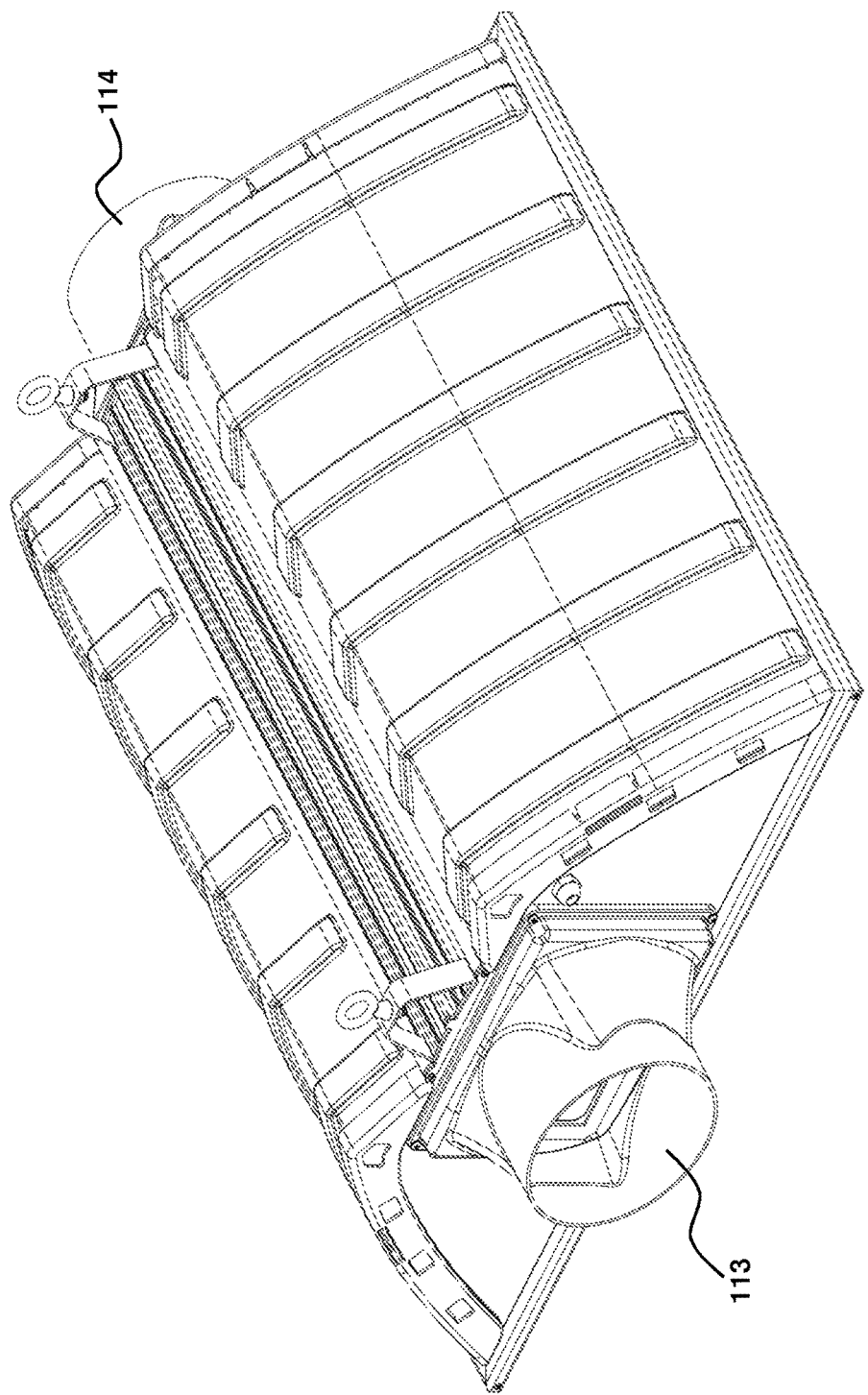
FIG. 23. Forced air-cooled optical reflector.
Figure 24:
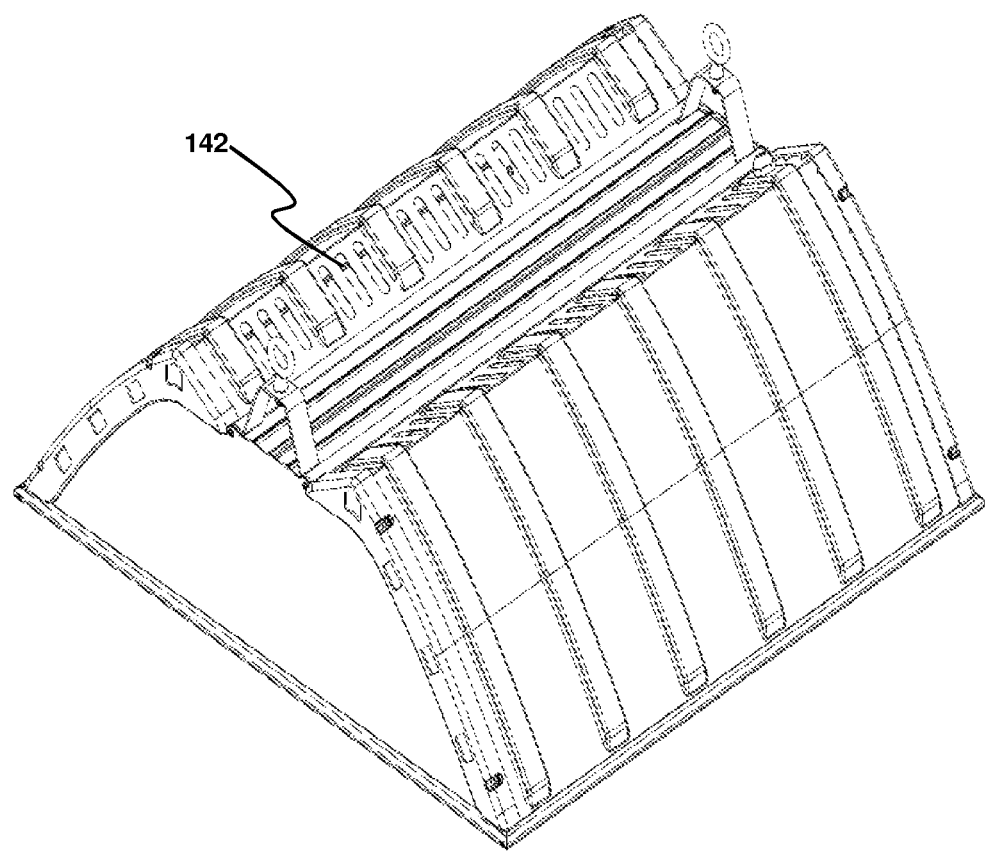
FIG. 24. Passively air-cooled optical reflector.
Figure 25:
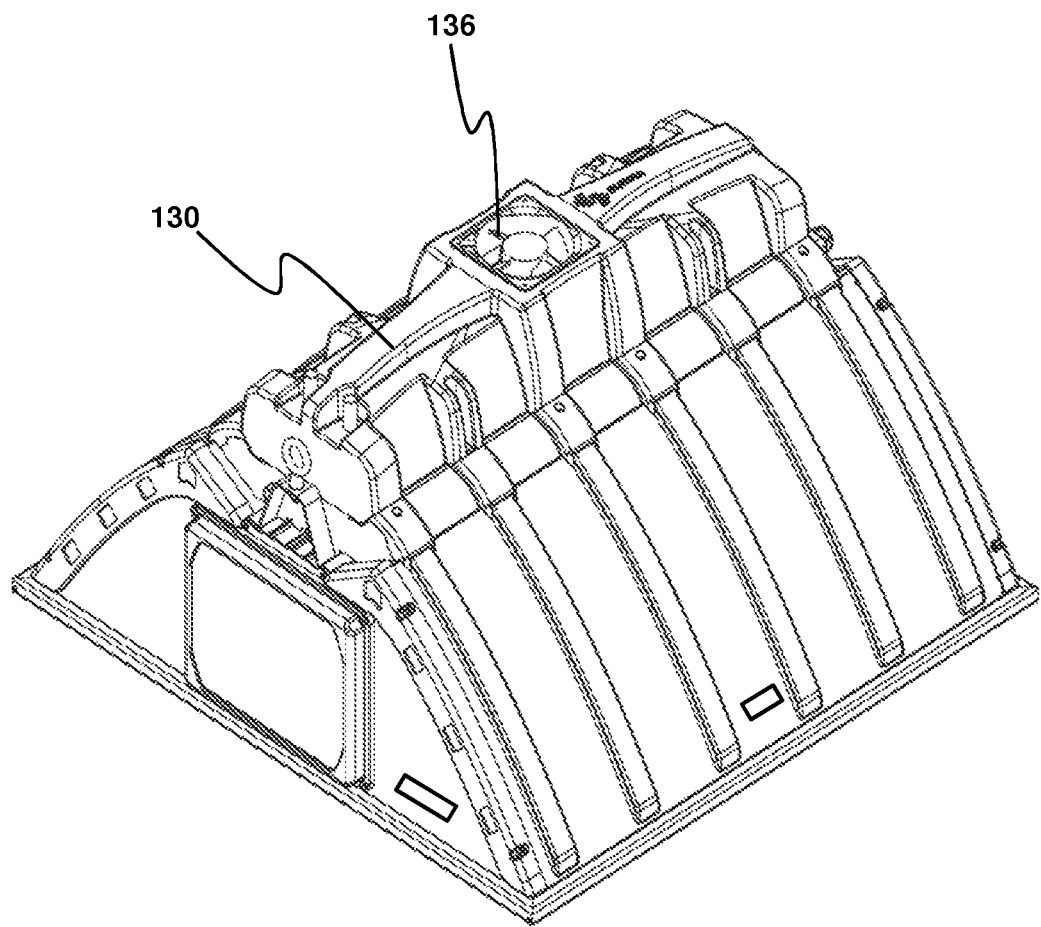
FIG. 25. Liquid-cooled optical reflector.

Cooling components may include air-cooled (see, e.g., FIG. 23 (forced air), FIG. 24 (passive air) and FIG. 25 (liquid-cooled). Any of the light sources and corresponding sleeves may be incorporated into a housing or other optical reflector-type system to increase light output. Any of the systems, accordingly, may provide a means of cooling the outer surface of the light source, including by any of passively vented air, forced air, and/or liquid cooling. For example, in the forced air system of FIG. 23, air the optical reflector has an inlet duct 113 for introducing air flow into the interior volume, and an outlet duct 114 for removing a flow of air from the interior volume. In the passively cooled system of FIG. 24, a plurality of thermal vents 142 extend through the sides and/or top of the reflector. In the liquid-cooled system of FIG. 24, a heat exchanger assembly 130 may comprise an air-to-water heat exchanger 130. A fan 136 forces air flow across the thermal heat exchanger 130. As desired, the cooled air may be introduced to a desired location to provide cooling capacity. For example, the cooled air may be introduced over an external surface of the reflector housing to dissipate heat. Alternatively, the cooled air may be introduced within the housing. Specific systems are provided in PCT/US2015/028803, including FIGS. 23-25 reproduced herein FIG. 6 illustrates the light source inside one of the optical reflectors of FIGS. 23-25.

The devices provided herein may also have air openings or bulb openings 930 (first opening) 932 (second opening) so that the bulb and corresponding insulative volume is not within an airtight seal. A part of the opening may be from a slot 920 in the electrical connector. Similarly, the spacer may be configured in such a manner, that while providing reliable positioning, some airflow is accommodated, at least enough that the bulb within the sleeve cannot be fairly described as in an airtight or pressurized configuration.

Example 2: Spacer Clip

The spacer clips provide an insulative volume around the bulb and prevent the bulb from touching the sleeve and may be conveniently configured to handle any of a wide range of bulb and sleeve geometries and sizes. An exemplary embodiment is shown in FIGS. 4-5. The spacer clips are formed by a ring member 420 with an outer edge 430, an inner edge 440, and protruding members 450 that may be circumferentially and evenly spaced at four positions along an outer facing surface 460. At certain opposibly facing positions around the ring member 420, such as two positions as illustrated, the protruding members 450 are in the form of spring tabs 470 having two members, an outer member 480 and an inner member 490. In this manner, the outer and inner protruding members provide reliable connection and spacing between the light source and sleeve.

Example 3: Increased Efficiency and Spectral Performance

The configuration of the sleeve provides improved spectral performance. By thermally isolating the bulb from the surrounding environment and retaining heat in close proximity, the efficiency of the light source increases. Quartz is particularly useful due to its optical clarity properties. FIGS. 7-10 are plots of the spectral output for different bulb wattages with and without a quartz sleeve for different times.

FIGS. 11-19 demonstrate that the addition of a quartz sleeve increases PPFD on a target area. The purpose of the experiments is to observe the spectral performance of an HPS bulb in a standard industry optical reflector with and without a quartz sleeve installed. Referring to FIGS. 11-19, the maximum PPFD is located at the center of the 4 foot by 4 foot target area. The target distance (from reflector to bottom) is 68 inches. The voltage to the ballast is 240 VAC. A photometer is used to collect light readings on the target area. As summarized in the table of FIG. 19, the addition of the quartz sleeve increases PPFD. After reaching steady state (3 hours), a 1000 W bulb, a commonly used bulb in the plant grow industry, with a quartz sleeve increases maximum PPFD by about 7% compared to without a quartz sleeve (compare 112.5 to 105.1), and increases average PPFD by about 5% (compare 89.17 to 84.85). A 750 W bulb yields an about 15% increase in maximum PPFD with a quartz sleeve compared to without a quartz sleeve (compare 84.7 to 73.4), and increases average PPFD by about 16% (compare 64.05 and 55.39).

Figure 20:
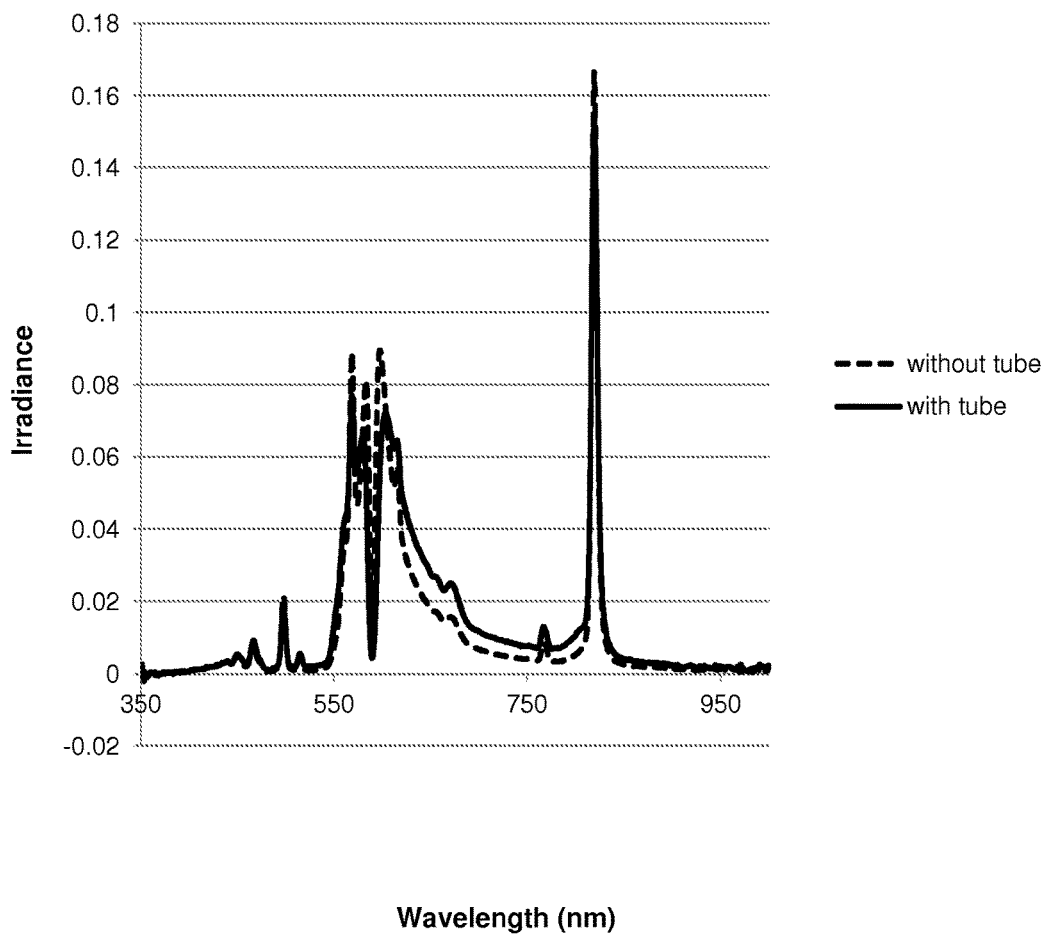
FIG. 20. Spectral output of 1000 W HPS bulb with (solid line) or without (dashed line) a quartz sleeve.
Figure 21:
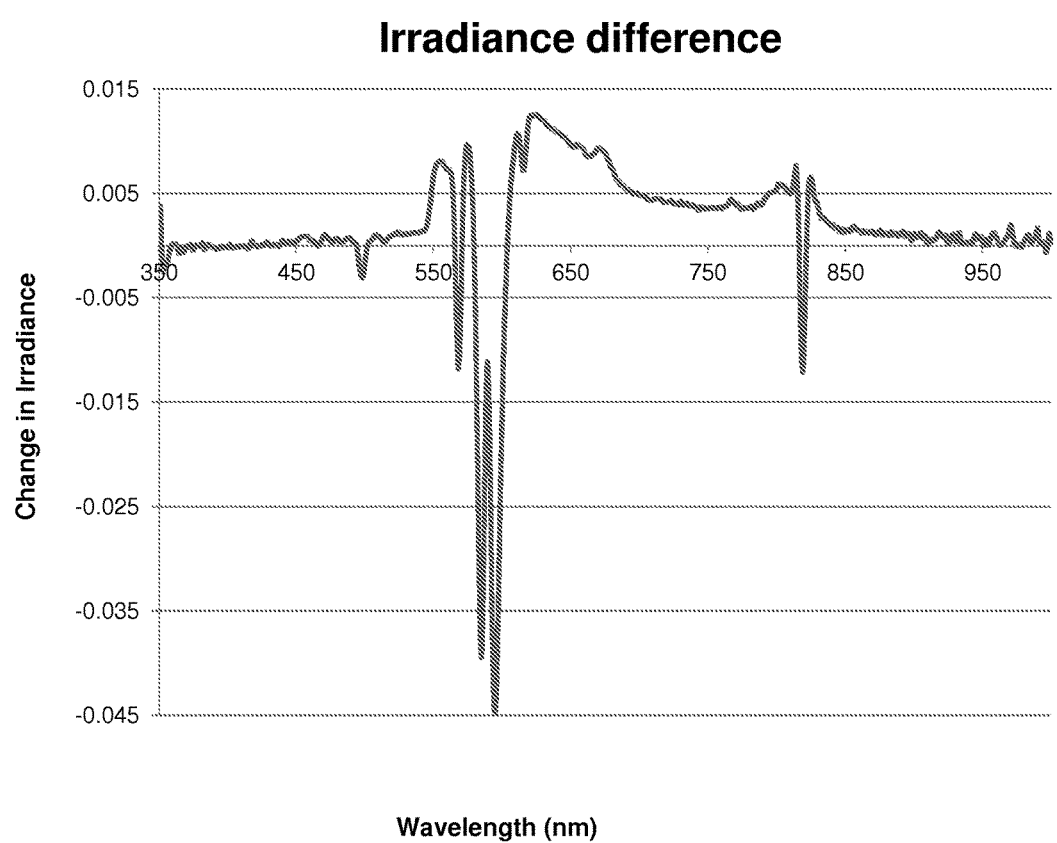
FIG. 21. Plot of the difference in spectral outputs of the with and without quartz tube systems of FIG. 20, illustrating an almost 10% increase in a spectral performance parameter corresponding to light intensity (irradiance) when running with the quartz sleeve compared to without the quartz sleeve.

FIGS. 20-22 further demonstrate the increased spectral performance of an HPS bulb with the addition of a quartz sleeve. FIG. 20 is a plot of the irradiance for a 1000 W bulb with and without a quartz sleeve. The bulb was in a fixture that was fully open to the surrounding room environment. Conceptually, the room that the fixture is mounted within corresponds to an environmentally controlled enclosure. The plot is composed of values reporting the average of 30 measurements taken over 5 minutes at 10 second intervals. All measurements are taken on axis (normal to the mounting surface of the fixture) with 300 cm shortest path length to lamp. The spectrometer aperture is 7 mm in diameter (3.85E-5 $m^2$). FIG. 21 is the difference in in irradiance for the sleeve/no-sleeve spectra of FIG. 20 and graphically illustrate the improvement with use of the thermally insulative and optically transparent sleeve. The plot illustrates there is little shift in spectrum, some decrease in the 560-580 nm and substantial increase between about 580 nm 800 nm. FIG. 22 summarizes the parameters used for the experiment of FIG. 20. These data indicate there is a 9.1% increase in irradiance for use with a quartz sleeve at almost identical power input. This is a dramatic and important improvement, that directly improves growth characteristic without increasing power requirement or sacrificing energy efficiency.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

Whenever a range is given in the specification, for example, a temperature range, a time range, a size range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A high intensity discharge light source comprising:
    a bulb having:
        a first end;
        a second end;
        a central region extending between said first end and said second end in a longitudinal direction; and
        an outer surface extending between said first end and said second end;
    a thermally insulative and optically transparent sleeve having an inner surface, said sleeve longitudinally aligned with and separated from said bulb outer surface by an insulating distance;
    a first spacer positioned adjacent to said bulb first end and between said bulb outer surface and said sleeve inner surface;
    a second spacer positioned adjacent to said bulb second end and between said bulb outer surface and said sleeve inner surface; wherein:
        said first spacer and said second spacer provides said insulating distance between said bulb outer surface and said sleeve inner surface, thereby forming an insulative volume around said bulb; and
        during use said bulb and surrounding insulative volume reach an elevated steady state operating temperature to maintain or enhance a spectral performance parameter.

2. The high intensity discharge light source of claim 1, wherein said spectral performance parameter is one or more of: an increase in photosynthetic photon flux density (PPFD); or a spectral shift.

3. The high intensity discharge light source of claim 1, wherein said spectral performance parameter is an enhanced PPFD of at least 5%.

4. The high intensity discharge light source of claim 3, wherein said bulb has an operating temperature that is substantially elevated compared to an equivalent bulb without said sleeve.

5. The high intensity discharge light source of claim 1, wherein said bulb outer surface and said sleeve are cylindrically shaped, and said bulb is concentrically positioned relative to said sleeve.

6. The high intensity discharge light source of claim 1, wherein said sleeve is removably connected to the bulb.

7. The high intensity discharge light source of claim 1, configured to connect to an optical reflector used for indoor plant growth.

8. The high-intensity discharge light source of claim 7, further comprising the optical reflector, wherein the optical reflector is air-cooled, liquid-cooled, or both air-cooled and liquid-cooled.

9. The high intensity discharge light source of claim 1, wherein said sleeve comprises a first sleeve end and a second sleeve end, said light source further comprising:
    a first socket that electrically connects said bulb first end and contacts said first sleeve end; and
    a second socket that electrically connects said bulb second end and contacts said sleeve second end.

10. The high intensity discharge light source of claim 1, wherein said sleeve is configured to withstand a bulb explosion event.

11. The high intensity discharge light source of claim 1, wherein said sleeve has a thickness that is greater than or equal to 0.5 mm and less than or equal to 4 mm.

12. The high intensity discharge light source of claim 1, wherein said sleeve comprises an optically transparent material that permits transmission of substantially all light emitted from said bulb having a wavelength that is between 400 nm to 700 nm.

13. The high intensity discharge light source of claim 1, wherein said sleeve comprises a lead-free material.

14. The high intensity discharge light source of claim 1, wherein said sleeve comprises quartz.

15. The high intensity discharge light source of claim 1, wherein each of said spacers comprise:
    a spacer clip having an annular opening for receiving a bulb end, said spacer clip positioned adjacent to said bulb end and between said bulb outer surface and said sleeve inner surface.

16. The high intensity discharge light source of claim 15, wherein each of said spacer clips comprises a ring member with an outer edge, an inner edge, and a plurality of protruding members circumferentially spaced along an outer facing surface, wherein the protruding members support said bulb end and a sleeve end.

17. The high intensity discharge light source of claim 16, wherein each of said protruding members are spring tabs that reliably position said bulb relative to said sleeve.

18. The high intensity discharge light source of claim 1, wherein said bulb is a high intensity discharge bulb selected from the group consisting of:
a high pressure sodium bulb,
a metal halide bulb, and
a mercury vapor bulb.

19. The high intensity discharge light source of claim 1, wherein said first and second spacers are: an integral part of said bulb first and second ends; an integral part of said sleeve first and second ends; or an integral part of said bulb first end and said sleeve.

20. The high intensity discharge light source of claim 1, wherein the thermally insulative volume has an opening to a surrounding environment.

21. The high intensity discharge light source of claim 20, wherein the opening is configured to minimize convective cooling generated by air flow from the surrounding environment to the bulb outer surface.

22. The high intensity discharge light source of claim 21, wherein the opening comprises a slot in a socket connected to the bulb first end and a tight-fit connection between the spacer and the sleeve inner surface and between the spacer and the bulb outer surface.

23. The high intensity discharge light source of claim 22, comprising a second opening positioned at the bulb second end.

24. The high intensity discharge light source of claim 1, further comprising:
an optical reflector having an interior volume that contains the high intensity discharge light source; and
an air blower fluidically connected to the interior volume;
wherein the air blower forces air over an outer surface of the thermally insulative and optically transparent sleeve to reduce unwanted heat build-up in the interior volume, without forcing a substantial amount of air flow through the insulative volume, to maintain an elevated operating temperature around the bulb.

25. A method of actively dissipating heat generated from the high intensity discharge light source of claim 1 positioned in an optical reflector, said method comprising the steps of: introducing a flow of air through an interior volume of said reflector and over an outer surface of said sleeve, thereby actively dissipating heat generated by said light source.

26. The method of claim 25, wherein said airflow does not substantially decrease an operating temperature of said high intensity discharge light source during use.

27. A method for operating a high intensity discharge light source at a constant operating temperature comprising the steps of:
providing a high-intensity discharge light source having a first end and a second end;
positioning a first spacer clip at or adjacent to said first end and a second spacer clip at or adjacent to said second end;
positioning a thermally insulative and optically transparent sleeve around said high-intensity discharge light source and said first and second spacer clips, wherein said spacer clip contacts an inner surface of said sleeve and an outer surface of said high-intensity discharge light source, thereby providing an insulative volume between said high intensity discharge light source and said sleeve;
energizing the light source; and
flowing a source of cooled air over an outer surface of said sleeve to cool an environment surrounding said sleeve without adversely affecting an insulative temperature of said insulative volume to maintain or enhance a spectral performance parameter.

28. The method of claim 27, further comprising the step of positioning an assembled high intensity discharge light source with said spacer clips and sleeve in an interior volume of an optical reflector, and said step of flowing a source of cooled air is one or more of:
forcing air-flow through an interior volume of said optical reflector; or
cooling air with a liquid-cooled heat exchanger.

* * * * *